United States Patent
Noda

(10) Patent No.: US 6,175,686 B1
(45) Date of Patent: Jan. 16, 2001

(54) RECORDING DATA GENERATION METHOD, RECORDING MEDIUM ON WHICH DATA IS RECORDED, AND DATA REPRODUCING APPARATUS

(75) Inventor: Chosaku Noda, Kawasaki (JP)

(73) Assignee: Kabushiki Kaisha Toshiba, Kawasaki (JP)

(*) Notice: Under 35 U.S.C. 154(b), the term of this patent shall be extended for 0 days.

(21) Appl. No.: 08/845,493

(22) Filed: Apr. 25, 1997

(30) Foreign Application Priority Data

Apr. 26, 1996 (JP) .................................................. 8-108013

(51) Int. Cl.[7] ....................................................... H04N 5/91
(52) U.S. Cl. ............................ 386/123; 386/122; 386/124
(58) Field of Search .................................. 386/36, 37, 40, 386/92, 108, 122, 123, 124, 112; 360/22, 23, 32

(56) References Cited

U.S. PATENT DOCUMENTS

| 4,800,550 | 1/1989 | Yamauchi . |
| 5,473,478 | * 12/1995 | Nakashika ............................. 360/22 |
| 5,677,981 | * 10/1997 | Kato et al. ........................... 386/122 |

FOREIGN PATENT DOCUMENTS

| 258059 | 3/1988 | (EP) . |
| 389006 | 9/1990 | (EP) . |
| 570214 | 11/1993 | (EP) . |
| 9-50677 | 2/1997 | (JP) . |

OTHER PUBLICATIONS

Patent Abstract of Japan, vol. 096, No. 005, May 1996 re-JP-A 8007496.

Patent Abstract of Japan, vol. 015, No. 143 (E–1054), Apr. 1991 re JP-A 03–019486.

Patent Abstract of Japan, vol. 095, No. 003 Apr. 1995, re JP-A 06 342523.

* cited by examiner

Primary Examiner—Wendy Garber
Assistant Examiner—Christopher Onuaku
(74) Attorney, Agent, or Firm—Pillsbury Madison & Sutro LLP

(57) ABSTRACT

A method of generating recording data of an extended format corresponding to a recording density higher than that of a standard format, includes the steps of dividing an input data sequence into a plurality of channels in units of predetermined data, performing error correction encoding for the respective channels by using the same error correction code as that of the standard format, thereby generating error correction blocks, synthesizing the error correction blocks of the respective channels, and generating recording data of the extended format from the synthesized error correction block.

18 Claims, 18 Drawing Sheets

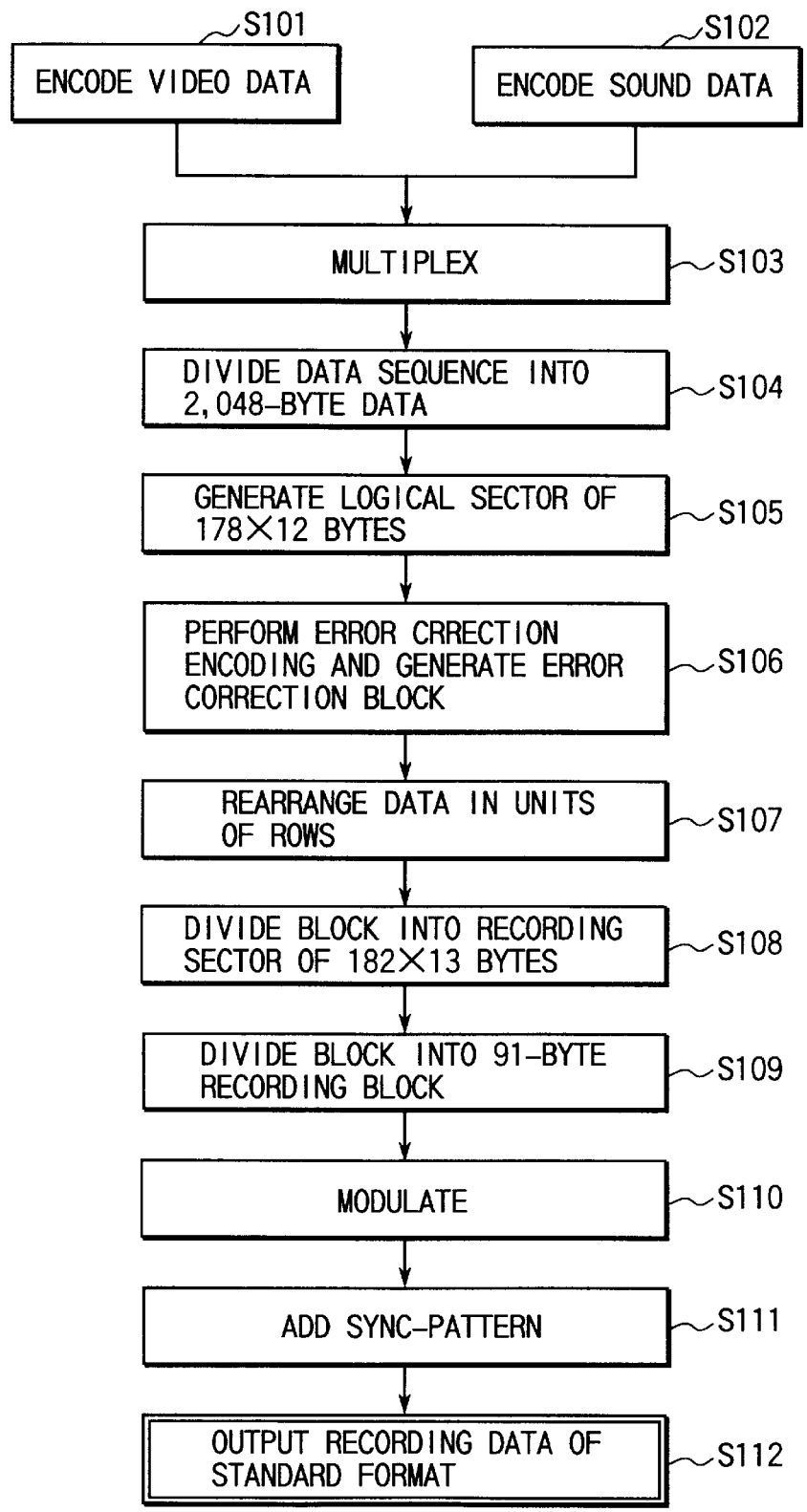
F I G. 3

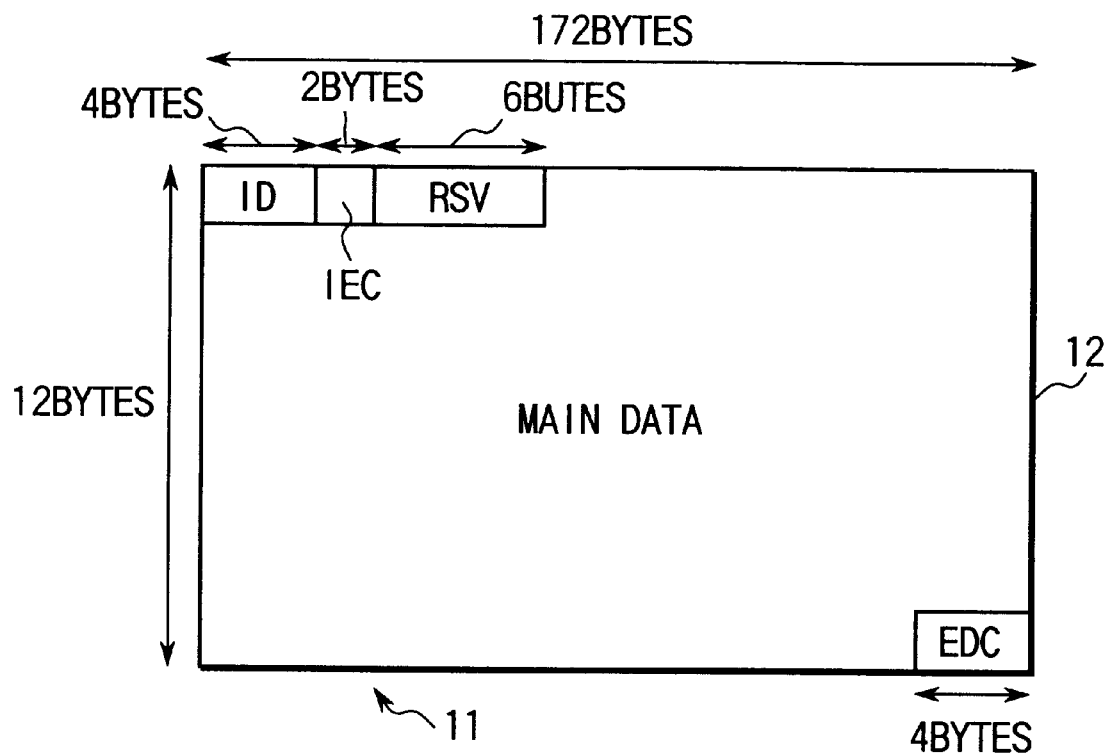
F I G. 4

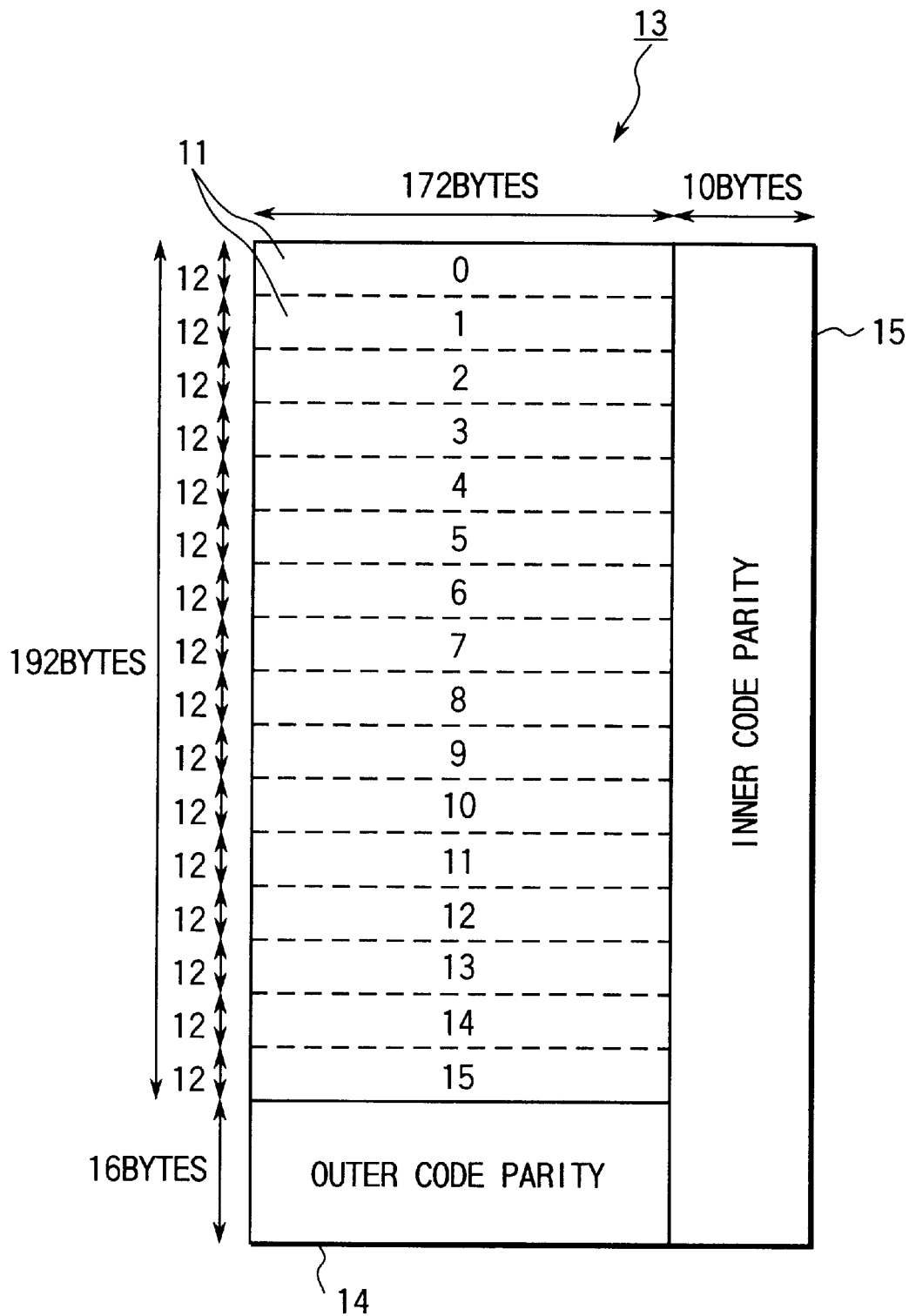
F I G. 5

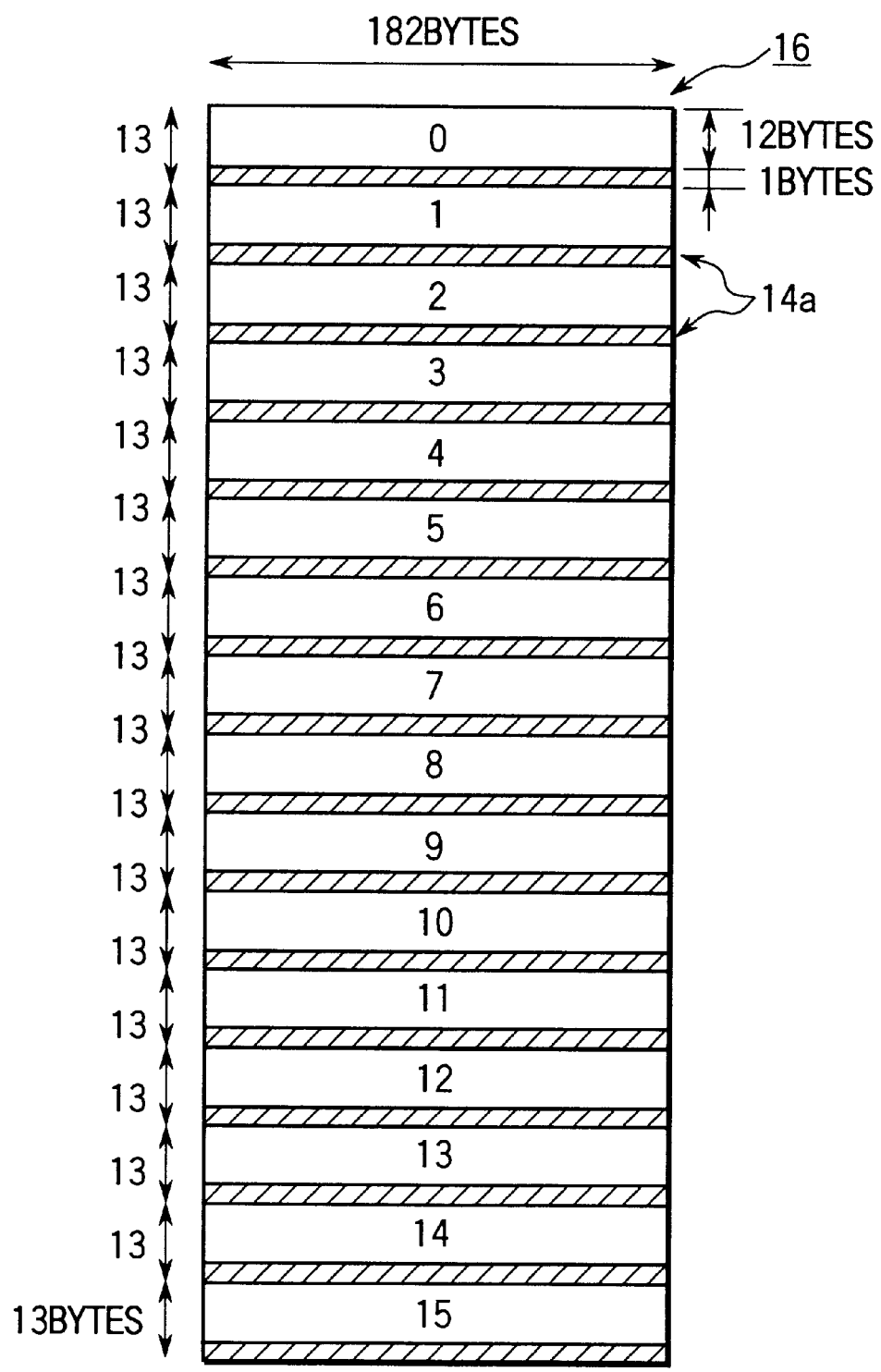
F I G. 6

| | | | |
|---|---|---|---|
| SY0 | | SY5 | |
| SY1 | | SY5 | |
| SY2 | | SY5 | |
| SY3 | | SY5 | |
| SY4 | | SY5 | |
| SY1 | | SY6 | |
| SY2 | | SY6 | |
| SY3 | | SY6 | |
| SY4 | | SY6 | |
| SY1 | | SY7 | |
| SY2 | | SY7 | |
| SY3 | | SY7 | |
| SY4 | | SY7 | |

F I G. 9

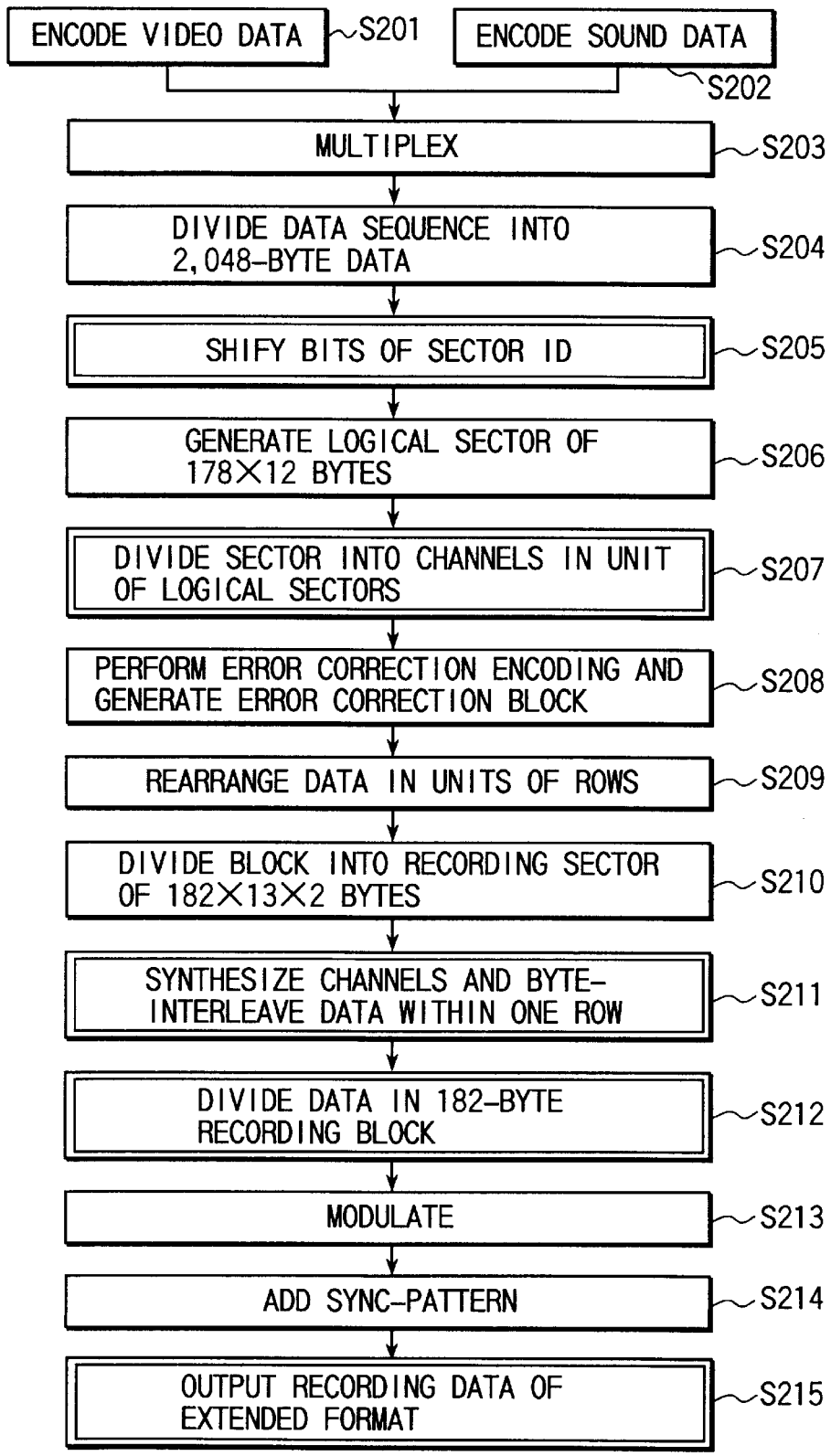
F I G. 11

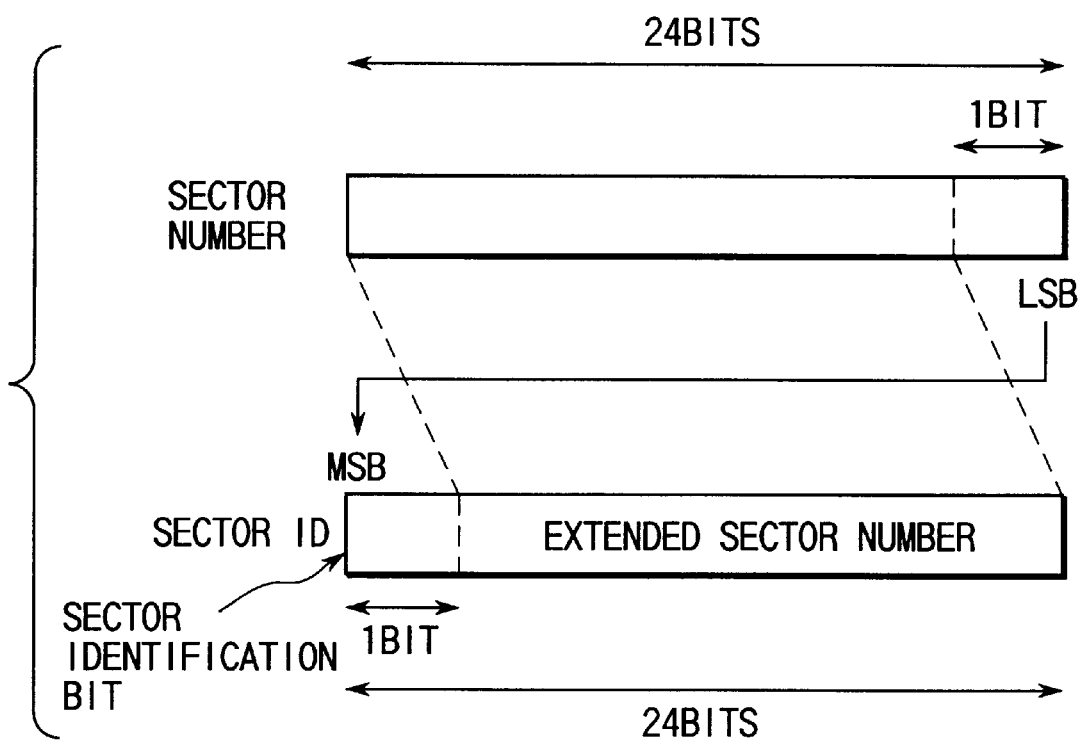
F I G. 12

FIG. 13A
$$\left\{\begin{array}{ll} 1 & 00000 \\ 2 & 00001 \\ 3 & 00010 \\ 4 & 00011 \\ 5 & 00100 \\ 6 & 00101 \\ 7 & 00110 \\ 8 & 00111 \\ \vdots & \vdots \\ 16 & 10000 \\ 17 & 10001 \\ 18 & 10010 \\ 19 & 10011 \\ \vdots & \vdots \\ 30 & 11101 \\ 31 & 11110 \\ 32 & 11111 \end{array}\right.$$ 31

FIG. 13B
CHANNEL A  32
$$\left\{\begin{array}{llll} 0 & 00000 \rightarrow & 0 & 00000 \\ 2 & 00010 \rightarrow & 1 & 00001 \\ 4 & 00100 \rightarrow & 2 & 00010 \\ 6 & 00110 \rightarrow & 3 & 00011 \\ \vdots & \vdots & \vdots & \vdots \\ 26 & 11010 \rightarrow & 13 & 01101 \\ 28 & 11100 \rightarrow & 14 & 01110 \\ 30 & 11110 \rightarrow & 15 & 01111 \\ & \text{MSB LSB} & & \end{array}\right.$$
CHANNEL IDENTIFICATION BIT FIG. 13C
CHANNEL B  32
$$\left\{\begin{array}{llll} 1 & 00001 \rightarrow & 16 & 10000 \\ 3 & 00011 \rightarrow & 17 & 10001 \\ 5 & 00101 \rightarrow & 18 & 10010 \\ 7 & 00111 \rightarrow & 19 & 10011 \\ \vdots & \vdots & \vdots & \vdots \\ 27 & 11011 \rightarrow & 29 & 11101 \\ 29 & 11101 \rightarrow & 30 & 11110 \\ 31 & 11111 \rightarrow & 31 & 11111 \end{array}\right.$$
CHANNEL IDENTIFICATION BIT

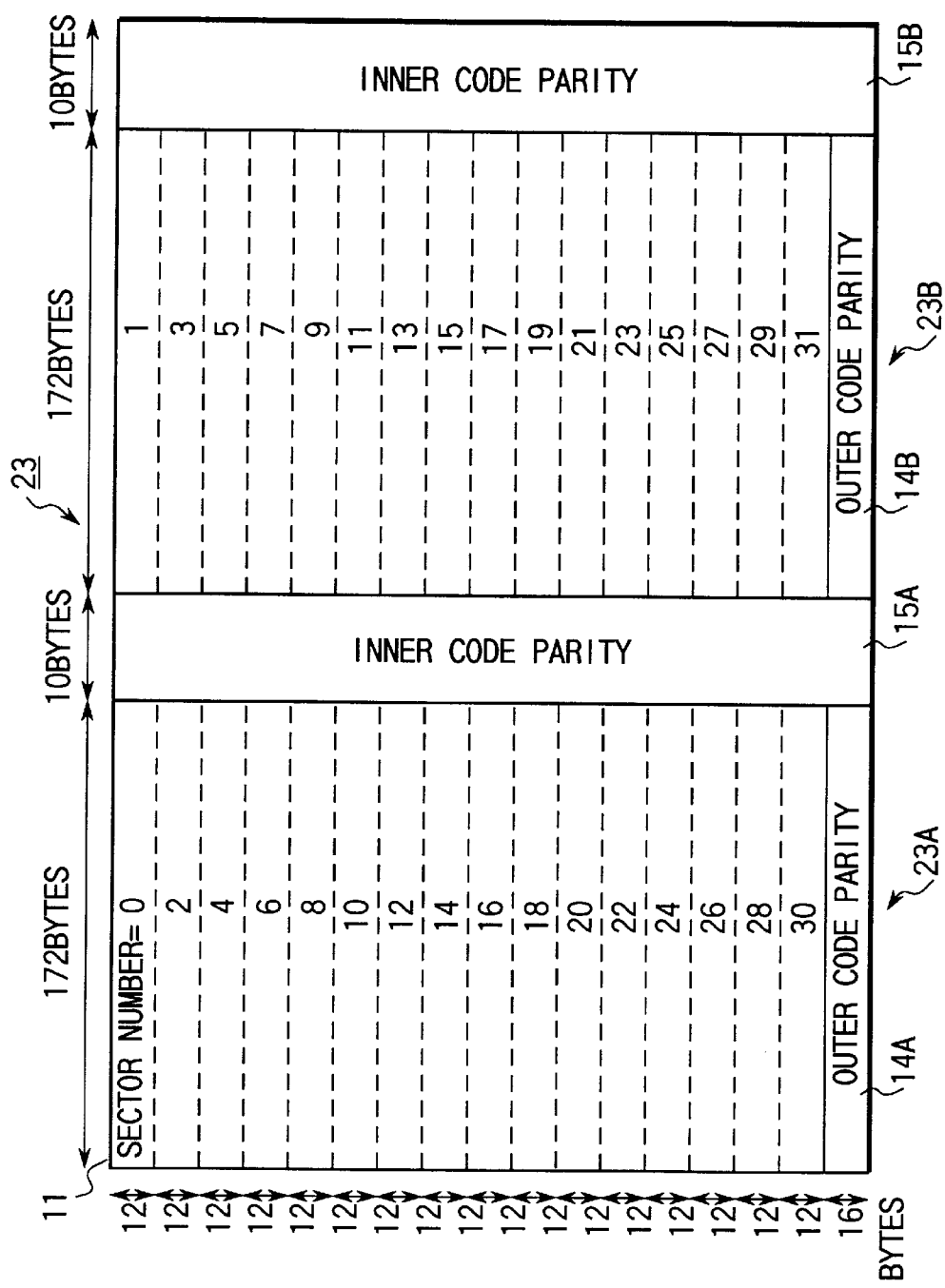
F I G. 14

FIG. 17

| 30 | | | | | | | | | | | | | 31 | 29 | | | | | | | | | | | | | 27' |
|---|---|---|---|---|---|---|---|---|---|---|---|---|---|---|---|---|---|---|---|---|---|---|---|---|---|---|---|
| SY0 | SY1 | SY2 | SY3 | SY4 | SY1 | SY2 | SY3 | SY4 | SY1 | SY2 | SY3 | SY4 | | | | | | | | | | | | | | | |
| SY5 | SY5 | SY5 | SY5 | SY5 | SY6 | SY6 | SY6 | SY6 | SY7 | SY7 | SY7 | SY7 | | | | | | | | | | | | | | | |

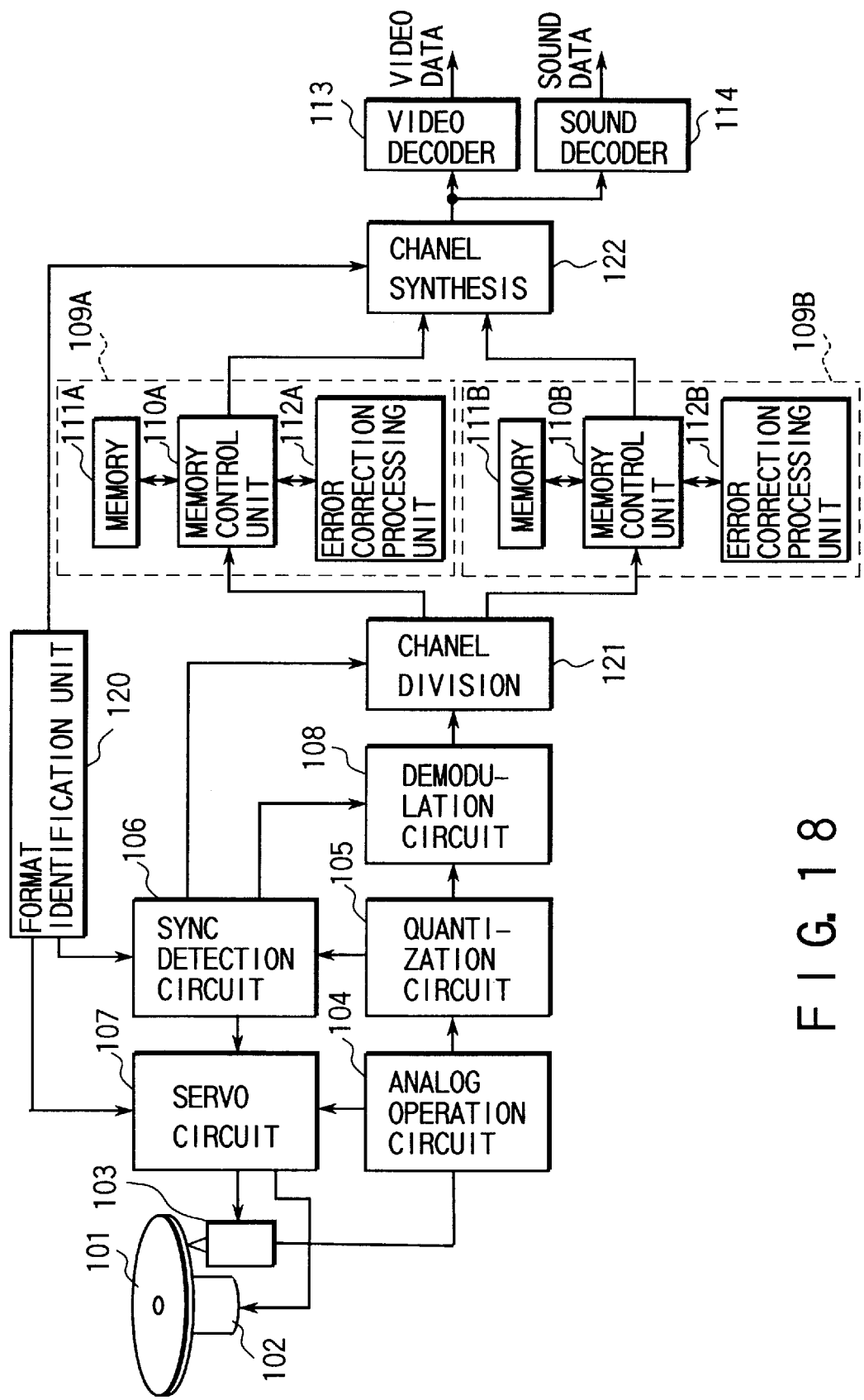
F I G. 18

RECORDING DATA GENERATION METHOD, RECORDING MEDIUM ON WHICH DATA IS RECORDED, AND DATA REPRODUCING APPARATUS

BACKGROUND OF THE INVENTION

The present invention relates to a recording/reproducing system for data including video data and sound data and, more particularly to, a method of generating recording data (data to be recorded) of an extended format corresponding to high-density recording which is compatible with a standard format corresponding to a certain recording density, a recording medium on which the generated data is recorded, and a data reproducing apparatus capable of reproducing the recording data of the two formats.

A digital recording apparatus which records digital data using an optical recording medium or a magnetic recording medium requires measures against errors which occur in reproduced data due to various factors. Among the causes of errors are a defect present in the recording medium and the influence of noise mixed in recording or reproduction. When high-density recording is to be performed, these errors inevitably occur at a given frequency.

For this reason, the digital recording apparatus generally performs error correction encoding for recording data to detect or correct errors which occur in reproduced data, and adds a check parity or records an error correction code. In data reproduction, the digital recording apparatus performs error correction decoding using the check parity to correct errors.

FIG. 1 shows a product code of a combination of two Reed-Solomon codes (to be referred to as RS codes hereinafter) as an example of the error correction code. The product code in FIG. 1 is prepared by error correction encoding in the following procedure.

First, recording data are arranged in a block of A×B bytes. B-byte data in the vertical direction of this block are subjected to encoding of an outer code so that a C-byte outer code parity is added as a check parity. Next, A-byte data in the horizontal direction are subjected to encoding of an inner code so that a D-byte inner code parity is added as a check parity.

In general, the Reed-Solomon code is often represented in the form of an (a,b) RS code, where a is the code length and b is the data length. According to this notation, the error correction codes in FIG. 1 can be expressed by a product code of a combination of an (A+D,A) RS code and a (B+C,B) RS code. This product code is recorded as one data sequence on the recording medium in units of rows.

In data reproduction, the following procedure is performed to decode the product code in FIG. 1 reproduced from the recording medium. First, reproduced data obtained as one data sequence are rearranged in the form of the product code in encoding. The inner code of the product code is decoded in the horizontal direction. The (A+D,A) RS code can correct errors of [D/2] bytes or less. Note that [n] is the maximum integer equal to or smaller than n. If it is determined in decoding the inner code that error correction is impossible, an error flag is output.

Then, the outer code is decoded in the vertical direction. In decoding the outer code, the error correction ability can be improved using the error flag output in decoding the inner code. By using the position of data included in the row to which the error flag is output, as erasure position information, the (B+C,B) RS code can correct errors of C bytes or less having the error flag.

When errors are corrected by decoding the inner and outer codes, errors in C rows or less can be corrected by the entire product code. Since this product code is recorded on successive rows, successive errors in C rows or less, i.e., errors of (A+D)×C bytes or less can be corrected by one product code. Errors successively generated on a reproduced data sequence are called burst errors. The burst errors occur due to a defect of the recording medium or step-out of a reproduction signal.

The error correction ability of the product code changes depending on the length of an error correction code to be used and the number of check parities added to the error correction code. In the RS code, if the data length is constant, the error correction ability is higher for a larger number of check parities; if the number of check parities is constant, the correction ability is higher for a smaller data length. When a product code consisting of RS codes is actually employed for the digital recording apparatus, an optimal combination must be designed for the recording apparatus on the basis of the S/N ratio of the reproduction signal, the recording characteristics of the recording medium, the sizes and generation frequency of defects generated in the medium, and the like.

Particularly in a recording apparatus using an exchangeable recording medium such as an optical disk, the structure of recording data and an error correction code must be defined as specifications, i.e., a recording format in order to maintain the compatibility of the medium. Once the recording format is fixed, the recording density and the error correction ability are also fixed. However, a larger recording capacity and a higher data rate are always required along with changes in demands for the recording apparatus and progress of techniques. If the recording format is fixed, these requirements cannot be satisfied.

To realize high-density recording so as to increase the recording capacity, the recording performance of the medium and the detection ability for a recorded signal must be improved. In terms of signal processing, the error correction ability of the recording format itself must be enhanced. If the recording density is high, the error data amount becomes relatively large even for defects or scratches having the same size on the recording medium. Therefore, to realize high-density recording, the error correction ability for the burst error must be enhanced particularly.

A method of increasing the number of outer code check parities is one method of improving the error correction ability for the burst error and realizing a recording format (to be referred to as an extended format hereinafter) suitable for higher-density recording.

FIG. 2 shows an error correction code in which the number of outer code check parities of the error correction code in FIG. 1 is doubled. With this setting, 2×C errors can be corrected by using error flags in outer code correction. Since errors in 2×C rows or less can be corrected by one product code, burst errors of 2×(A+D)×C bytes or less can be corrected.

In the method of increasing the number of check parities and realizing the extended format, the error correction ability is improved. However, the occupation ratio of main data in the product code decreases from (A×B)/((A+D)×(B+C)) in the recording format used before high-density recording (to be referred to as a standard format hereinafter) to (A×B)/((A+D)×(B+(2×C))), resulting in a decrease in data recording efficiency. The decrease in recording efficiency is undesirable for an increase in recording capacity.

In the method of increasing the number of check parities and realizing the extended format, longer burst errors can be corrected. However, the error correction ability for short burst errors is not effectively improved.

In general, although the RS code having a large number of check parities has a higher error correction ability, the size and processing time of a decoding circuit for decoding the error correction code greatly increase. Since the above error correction code for the extended format has a double number of outer code check parities, a dedicated error correction circuit constituted by a large-size circuit or a high-speed circuit is required, compared to a decoding circuit for the error correction code for the standard format. To increase both the density and speed, a large-size, high-speed data processing circuit is required.

In the method of increasing the number of check parities and realizing the extended format, error correction circuits for the standard and extended formats must be arranged to realize a compatible data reproducing apparatus capable of reproducing data from not only the medium on which data of the high-density extended format is recorded but also the medium on which data of the standard format used before high-density recording is recorded. However, both the error correction circuits are not simultaneously operated. To realize the compatible data reproducing apparatus, the circuit configuration becomes redundant.

The above-mentioned problems are as follows. That is, in the extended format in which the error correction ability is improved by increasing the number of check parities, the effective data amount occupied in recording data is reduced to decrease the data recording efficiency, and data processing using a large-size error correction circuit must be performed in data reproduction. Further, to realize a compatible data reproducing apparatus which can reproduce data recorded in the standard and extended formats, data processing circuits dedicated for the respective formats are required resulting in a redundant circuit configuration and a high-cost apparatus.

BRIEF SUMMARY OF THE INVENTION

Accordingly, it is an object of the present invention to provide a recording data generation method which can generate recording data of the extended format having a higher error correction ability corresponding to high-speed, high-density recording than that for recording data of a given standard format, while keeping the data recording efficiency, and requires no data processing circuits dedicated for the respective formats in data reproduction, and a recording medium on which the generated data is recorded.

It is another object of the present invention to provide a data reproducing apparatus which can reproduce data recorded in these standard and extended formats with a circuit configuration as small as possible without using any data processing circuit dedicated for each format.

According to one aspect of the present invention, there is provided a method of generating recording data of an extended format corresponding to a recording density higher than that of a standard format, comprising the steps of: dividing an input data sequence into a plurality of channels in units of predetermined data; performing error correction encoding for the respective channels by using the same error correction code as that of the standard format, thereby generating error correction blocks; synthesizing the error correction blocks of the respective channels; and generating recording data of the extended format from the synthesized error correction block.

According to another aspect of the present invention, there is provided a recording medium on which recording data of an extended format corresponding to a recording density higher than a standard format is recorded by a predetermined generation procedure, the generation procedure comprising: dividing an input data sequence into a plurality of channels in units of predetermined data; performing error correction encoding for the respective channels by using the same error correction code as that of the standard format, thereby generating error correction blocks; synthesizing the error correction blocks of the respective channels; and generating recording data of the extended format from the synthesized error correction block.

According to still another aspect of the present invention, there is provided a data reproducing apparatus for reading and processing data of a standard or extended format which are recorded on a recording medium and subjected to error correction encoding using the same error correction code, comprising: means for identifying whether a format of the reproduced data read from the recording medium is the standard format or the extended format corresponding to a recording density higher than that of the standard format; means for, on the basis of an identification result of the format identification means, outputting the reproduced data to at least one channel when the reproduced data are in the standard format, and dividing the reproduced data into a plurality of channels and outputting the data when the reproduced data are in the extended format; means for performing error correction processing for the reproduced data output from the channel division means; and means for, on the basis of the identification result of the format identification means, outputting the reproduced data of at least one channel having undergone error correction processing when the reproduced data are in the standard format, and synthesizing and outputting the reproduced data of the plurality of channels having undergone error correction processing when the reproduced data are in the extended format.

According to still another aspect of the present invention, there is provided a data reproducing apparatus for reading and processing data of a standard or extended format which are recorded on a recording medium and subjected to error correction encoding using the same error correction code, comprising: means for outputting the reproduced data to at least one channel when the reproduced data read from the recording medium are in the standard format, and dividing the reproduced data into a plurality of channels and outputting the data when the reproduced data are in the extended format; means for performing error correction processing for the reproduced data output from the channel division means; and means for outputting the reproduced data of at least one channel having undergone error correction processing when the reproduced data are in the standard format, and synthesizing and outputting the reproduced data of the plurality of channels having undergone error correction processing when the reproduced data are in the extended format.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 3 is a flow chart showing a procedure of generating recording data of the standard format in an embodiment of the present invention;

FIG. 4 is a view showing the structure of a logical sector;

FIG. 5 is a view showing the structure of an error correction block of the standard format;

FIG. 6 is a view showing the structure of the error correction block of the standard format upon rearranging data in units of rows;

FIG. 9 is a view showing a method of assigning a sync-pattern sequence of the standard format;

FIG. 11 is a flow chart showing a procedure of generating recording data of the extended format in this embodiment;

FIG. 12 is a view showing a procedure of generating a sector ID of the extended format;

FIGS. 13A to 13C are views showing the procedure of generating the sector ID of the extended format in detail;

FIG. 14 is a view showing the structure of an error correction block of the extended format;

FIG. 17 is a view showing a method of assigning a sync-pattern sequence of the extended format;

FIG. 18 is a block diagram showing the arrangement of a data reproducing apparatus common to the standard and extended formats.

DETAILED DESCRIPTION OF THE INVENTION

Figure 1:
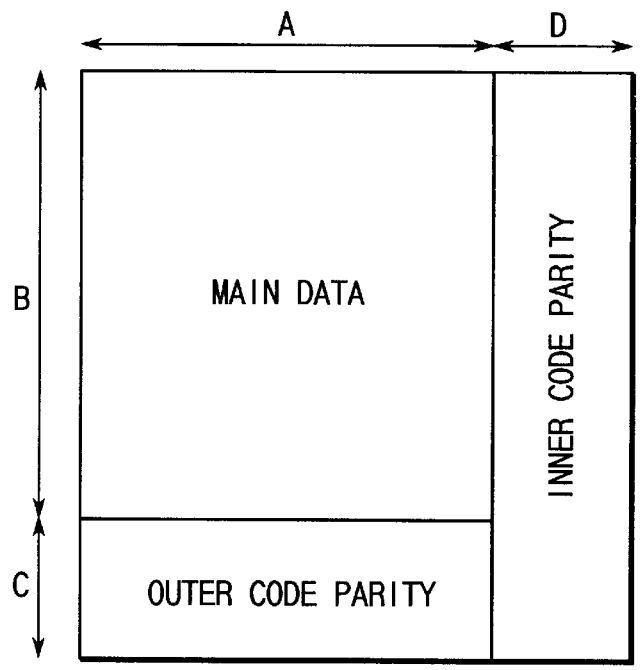
FIG. 1 is a view showing the structure of an error correction block of a prior art.
Figure 2:
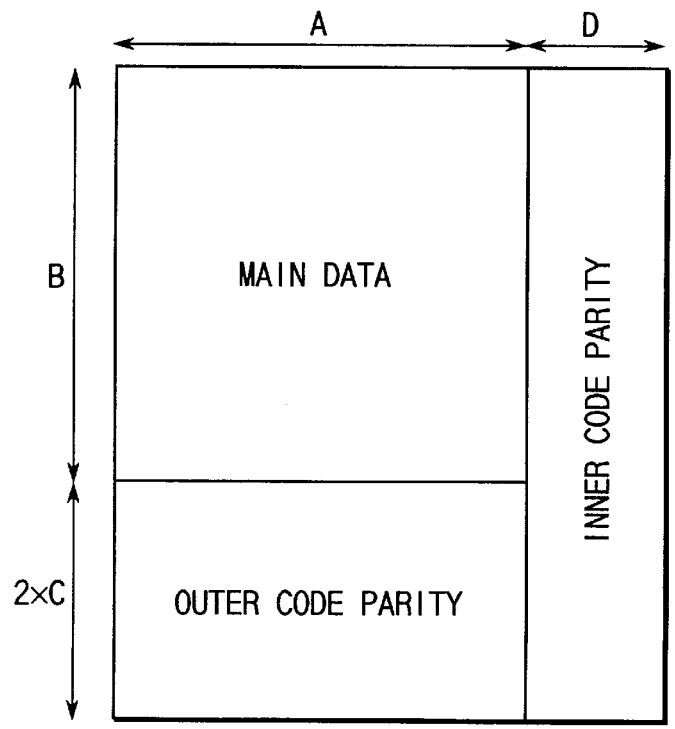
FIG. 2 is a view showing the structure of an error correction block of the extended format of the prior art.

An embodiment of the present invention will be described below with reference to several views of the drawing.

An embodiment in which the present invention is applied to a digital video disk will be explained. The digital video disk means a disk-like recording medium, such as an optical disk, on which video and sound signals are recorded upon compression and encoding by digital processing. This embodiment will exemplify a procedure of generating recording data of the standard and extended formats to be recorded on this digital video disk, and a data reproducing apparatus which reproduces the recorded data and processes the reproduced data.
(Standard Format)

In a procedure of generating recording data of the standard format according to the present invention, recording data of the standard format corresponding to a predetermined recording density are generated from an error correction block obtained by performing error correction encoding for an input data sequence by using a predetermined error correction code. More specifically, the error correction block obtained by performing error correction encoding for the input data sequence by using the predetermined error correction code is divided in units of m bytes (m is an integer of 1 or more), thereby generating the first data block. A sync-pattern is added to each first data block to generate the first sync-block serving as the unit of recording data of the standard format.

More specifically, a sector ID for identifying a sector is added to a data sector prepared by dividing the input data sequence in units of first data, thereby generating a logical sector. The error correction block obtained by performing error correction encoding for each second data including k (k is an integer of 2 or more) logical sectors by using a predetermined error correction code is divided in units of m bytes (m is an integer of 1 or more), thereby generating the first data blocks. A sync-pattern is added to each first data block to generate the first sync-block serving as the unit of recording data of the standard format.

The procedure of generating recording data of the standard format according to this embodiment will be described below with reference to a flow chart shown in FIG. 3.

A video encoder and a sound encoder respectively perform encoding such as data compression or multiplexing of additional information for video and sound signals to be recorded (steps S101 and S102). The compressed video and sound data are multiplexed to generate one input data sequence (bit stream: step S103). This input data sequence is divided into 2,048-byte data sectors (step S104). From each data sector, a logical sector of 178×12 bytes is generated (step S105).

As shown in FIG. 4, a logical sector 11 is constituted by 2,048-byte main data 12 as the data sector obtained in step S104, a 4-byte ID portion for identifying this sector, a 2-byte IEC serving as a check parity for checking an error which occurs in this ID portion, a 6-byte RSV serving as a preliminary information area for future use, a 2,048-byte data sector, and a 4-byte EDC for checking an error generated in the logical sector 11.

In the ID portion, a sector ID of at least 24 bits is recorded. The sector ID is used to specify the position of the logical sector 11 in the reproduced data sequence. The ID portions record 24-bit sector numbers which are generated in the ascending order in accordance with the time series of the input data sequence, i.e., in the ascending order of the logical sector sequence obtained by arranging logical sectors 11 in time series. This sector ID is subjected to encoding of a (6,4) RS code, and a generated check parity is recorded on the IEC portion. The RSV portion records, e.g., "0". Encoding of a cyclic Hamming code of the 32nd order is performed for the ID, IEC, RSV, and the data sector, and the generated 32-bit check parity is recorded on the EDC portion.

The 2,048-byte main data 12 is partially scrambled upon generating the EDC. A pattern used for scramble processing is a random data sequence, e.g., an M sequence. This random sequence can be generated by, e.g., the following procedure.

First, a 15-bit shift register is prepared. Outputs from the most significant bit and the fifth bit from the most significant bit are exclusive-ORed, and the result is input to the least significant bit. As scramble data, outputs from the lower 8 bits of this shift register are used. Each time scramble data are extracted, this shift register is shifted eight times in the upper bit direction, and then next scramble data are extracted. The scramble data generated in the above procedure and the main data 12 are exclusive-ORed for each bit, thereby performing scramble processing. In this case, a scramble data sequence to be generated can be changed by changing the initial value of the shift register. The initial value is changed in accordance with, e.g., the contents of the sector ID.

Next, k (=16) logical sectors 11 shown in FIG. 4 are stacked in the vertical direction. The set of the 16 logical sectors 11 is used as the unit of data of error correction encoding to perform error correction encoding and add check parities, thereby generating an error correction block 13 shown in FIG. 5 (step S106). In this case, double Reed-Solomon product codes are used for the error correction code.

More specifically, 192-byte data in the vertical direction of the k (=16) stacked logical sectors 11 are encoded (outer-encoded) to generate a 16-byte outer code parity 14. The outer code is a (208,192) RS code. All the columns (172 columns) of the 16 stacked logical sectors 11 are similarly outer-encoded. 172-byte data in the horizontal direction of the 16 stacked logical sectors 11 is encoded (inner-encoded) to generate a 10-byte inner code parity 15. The inner code is a (182,172) RS code. All the rows of the 16 stacked logical sectors 11, i.e., 208 rows including the outer code parity 14 are similarly inner-encoded.

To eliminate a recording data disparity, data are rearranged in units of rows in the error correction block 13 generated in step S106 (step S107). This data rearrangement is performed by inserting one row 14a of the 16-row outer code parity 14 in each boundary portion between two adjacent ones of the 16 stacked logical sectors 11, as shown in FIG. 6.

Figure 7:
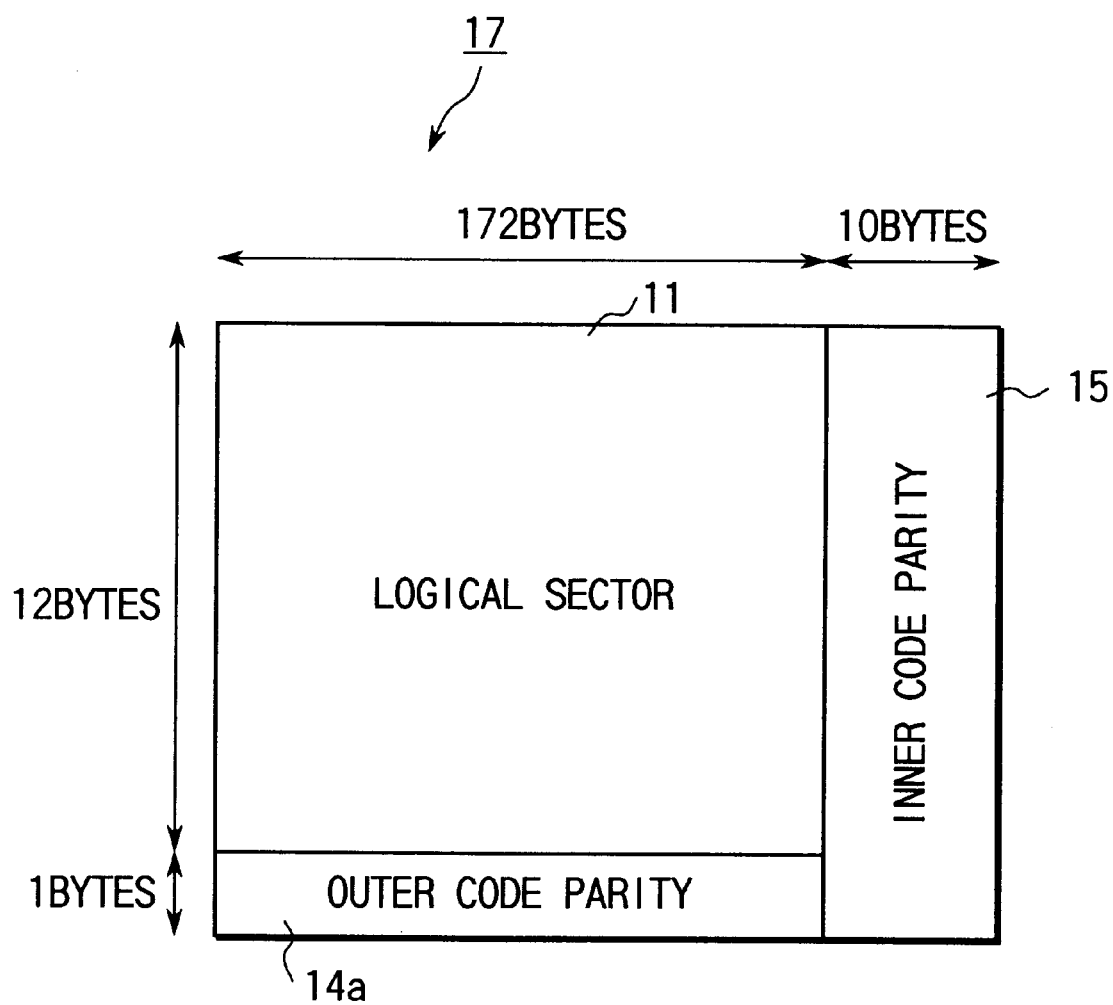
FIG. 7 is a view showing the structure of a recording sector of the standard format.

An error correction block 16 obtained upon data rearrangement shown in FIG. 6 in step S107 is divided into 16 portions in units of 13 rows to prepare recording sectors 17 each consisting of 182×13 bytes, as shown in FIG. 7 (step S108). Each recording sector 17 is constituted by the logical sector 11, the outer code parity 14a of one row, and the inner code parity 15, as shown in FIG. 7. The sector ID is arranged at the head of the recording sector 17. The sector IDs are arranged in the ascending order for the successive recording sectors 17.

A procedure of generating a sync-block as the minimum unit of recording data from the recording sector 17 will be explained with reference to FIGS. 8A to 8C.

Figures 8A, 8B, 8C:
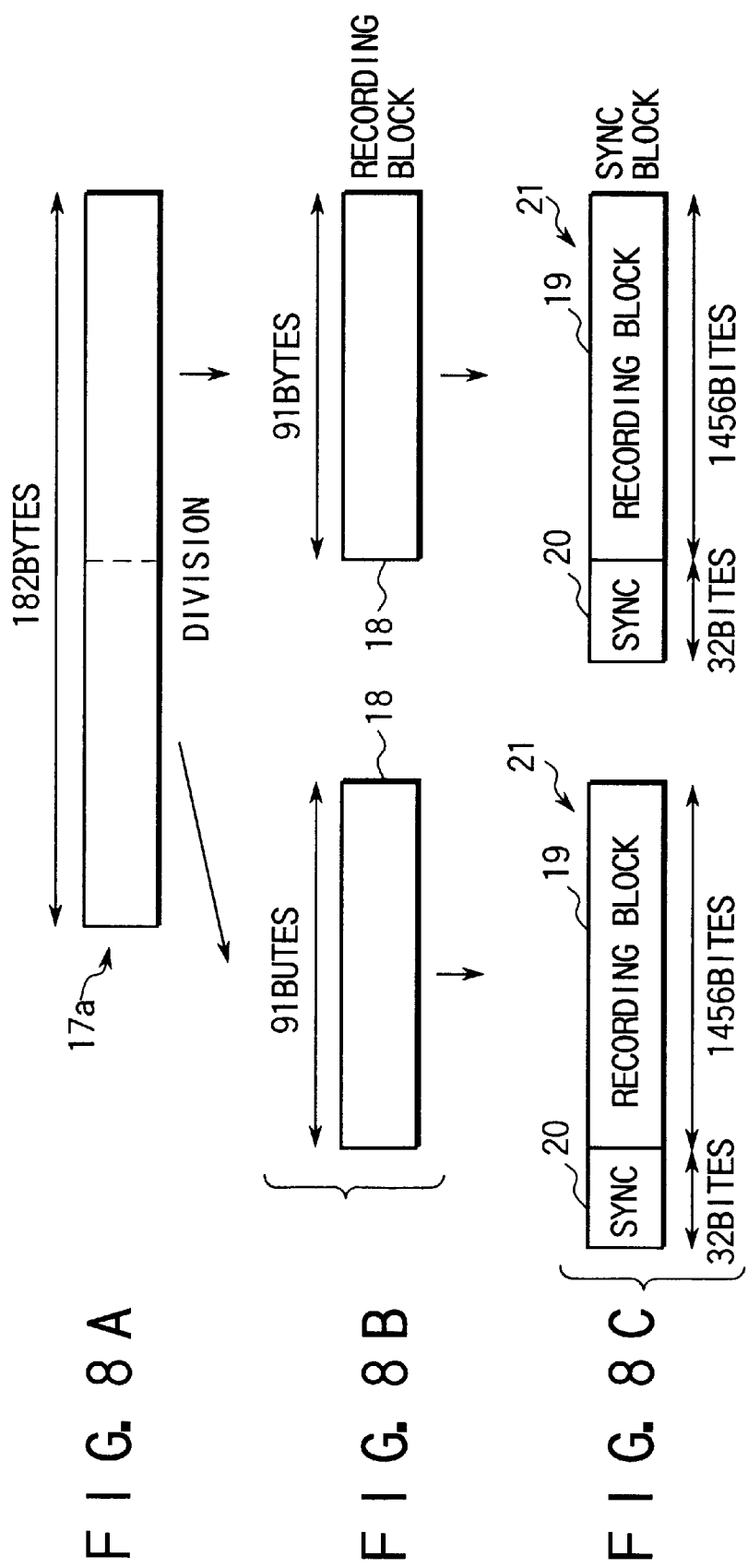
FIGS. 8A to 8C are views showing a procedure of generating a sync-block of the standard format.

First, as shown in FIG. 8A, data 17a of one row is extracted from the recording sector 17. As shown in FIG. 8B, the data 17a is further divided in units of m=91 bytes, thereby generating recording blocks 18 of the standard format serving as the first data blocks (step S109). In this case, the sector ID is recorded on only a recording block 18 shown on the left side of FIG. 8B, which block corresponds to the data 17a of the one first row of the recording sector 17 shown in FIG. 7. That is, the sector ID is recorded on the recording block 18 corresponding to the head of the recording sector 17.

Next, data of the recording block 18 obtained in step S109 are converted, i.e., modulated in accordance with the recording medium of a recording/reproducing system and signal transmission characteristics (step S110). To decrease the recording density of the recording medium as much as possible, the maximum frequency of a recording signal is desirably low. In terms of signal transmission, a low frequency component is desirable. Taking these requirements into consideration, a method using frequency components which generally concentrate in an intermediate band is employed as the modulation method in step S110. In this case, as the modulation method, an 8/16-modulation method of converting 8-bit data (one symbol) into 16-bit data is used. 91-byte data which constitutes the recording block 18 is 8/16-modulated to obtain 1,456-bit data.

In reproducing the recorded data, if the boundary between the recording blocks 18 cannot be determined, original data cannot be reconstructed. For this reason, as shown in FIG. 8C, a 32-bit sync-pattern 20 is added to the head of each modulated recording block 19 to generate a 1,488-bit sync-block 21 (step S111). This sync-block 21 is the unit of recording data of the standard format. The sync-block 21 is output to a recording circuit (not shown) to record data on a recording medium (optical disk: step S112).

As a desirable sync-pattern 20, a pattern which can be easily detected from the recording data sequence and is not erroneously detected is selected. Eight types of sync-pattern sequences SY0 to SY7 are prepared for the sync-pattern 20. From these sync-pattern sequences SY0 to SY7, one sync-pattern 20 is selected in accordance with the position of the recording block 19 in the modulated recording sector 17'. FIG. 9 shows the correspondence between the sync-pattern sequences SY0 to SY7 and the recording block 19.

When data recorded on a recording medium are to be reproduced, the relative position of the sync-block 20 with respect to the head of the modulated recording sector 17' can be determined by determining which of the sync-pattern sequences SY0 to SY7 is the sync-pattern 20 of the sync-block 21 in the successively reproduced data.

Next, a data reproducing apparatus for reproducing data from an optical disk on which data is recorded in the standard format will be described with reference to FIG. 10.

Figure 10:
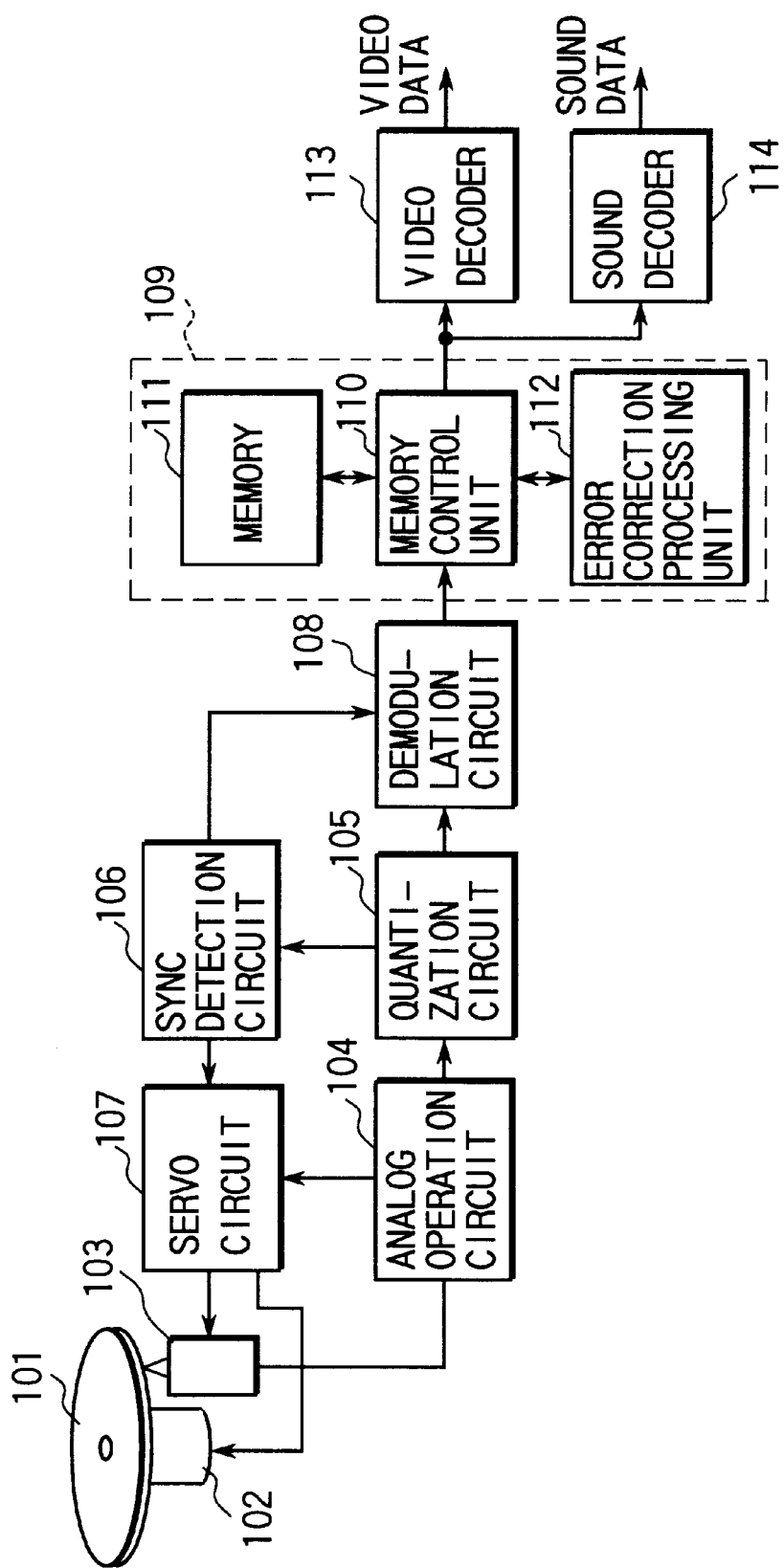
FIG. 10 is a block diagram showing the arrangement of a data recording apparatus for the standard format.

Referring to FIG. 10, recording data of the standard format generated by the above-described procedure are recorded on an optical disk 101 in advance. In data reproduction, a signal recorded on the optical disk 101 is read by an optical pickup 103, while rotating the optical disk 101 by a spindle motor 102 at a predetermined speed. The optical pickup 103 irradiates a laser beam emitted from, e.g., a semiconductor laser as a small spot through an object lens, on the data recording surface of the optical disk 101, and guides the reflected beam to a multi-division photodetector.

A plurality of output signals output from the multi-division photodetector of the optical pickup 103 are input to an analog operation circuit 104, which generates a reproduction signal corresponding to the data recorded on the optical disk 101, focus and tracking error signals for focus and tracking servos, and a speed control signal for controlling the rotation speed of the spindle motor 102. Focus servo control is control for making the focal point of the object lens of the optical pickup 103 coincide with the data recording surface of the optical disk 101. Tracking servo control is control for allowing the laser beam irradiated on the optical disk 101 by the optical pickup 103 to trace a track on the optical disk 101. The focus and tracking error signals are supplied to a servo circuit 107.

The reproduction signal generated by the analog operation circuit 104 is quantized (e.g., converted into a binary signal) by a quantization circuit 105, and then input to a sync detection circuit 106 and a demodulation circuit 108. The sync detection circuit 106 detects the sync-pattern 20 added to the head of the above-mentioned sync-block 21 in the reproduction signal. More specifically, the sync detection circuit 106 detects the position of the sync-pattern and the pattern.

The reproduction signal includes a bit error which occurs due to a medium defect of the optical disk 101 and the influence of noise. For this reason, in some cases, the sync detection circuit 106 cannot detect the sync-pattern 20 at an original detection position, or erroneously detects the sync-pattern at a position different from that of the original sync-pattern. The sync detection circuit 106 has a function of accurately detecting the position of the sync-pattern 20 in consideration of the above influences. In addition, the sync detection circuit 106 determines the respective boundaries of the modulation symbol, the recording block 19, and the modulated recording sector 17' by using the detection position signal of the sync-pattern 20 and a sync-pattern detection signal which represents which of the sync-pattern sequences SY0 to SY7 is the sync-pattern 20.

An output from the sync detection circuit 106 is input to the servo circuit 107 and the demodulation circuit 108. The servo circuit 107 generates a servo control signal for controlling the object lens and the like on the basis of the respective error signals from the analog operation circuit 104 and the sync-pattern detection signal from the sync detection circuit 106, thereby controlling the above focus and tracking servos and the rotation speed.

The demodulation circuit 108 divides a signal (e.g., a binary signal) from the quantization circuit 105 into 16-bit data on the basis of the boundary of the modulation symbol. Thereafter, the demodulation circuit 108 16/8-demodulates the 16-bit data into 8-bit data in a procedure reverse to that of the above-described modulation, and outputs the reproduced data.

The reproduced data from the demodulation circuit 108 are input to a memory control unit 110 in a data processing unit 109. The data processing unit 109 is constituted by the memory control unit 110, a memory 111 controlled by the memory control unit 110, and an error correction processing unit 112. The memory control unit 110 extracts the ID from the reproduced data from the demodulation circuit 108 on the basis of the head of the recording sector 17. Then, the memory control unit 110 checks an error in the extracted ID by using the IEC. Further, the memory control unit 110 sequentially writes the reproduced data in the memory 111 on the basis of the head of the sector and the sector ID in order to protect the reliability by utilizing the fact that the sector IDs of the successive recording sectors 17 are arranged in the ascending order.

When the reproduced data of the 16 recording sectors 17 which constitute one error correction block 16 are written in the memory 111, the memory control unit 110 reads out inner code data from the memory 111 and transfers them to the error correction processing unit 112. Upon reception of the inner code data, the error correction processing unit 112 performs error correction of inner codes. If there is an error beyond the inner code error correction ability, the error correction processing unit 112 determines that error correction is impossible, and generates an error flag. Then, the error correction processing unit 112 writes the error-corrected data and the error flag in the memory 111.

After the error correction processing unit 112 completes error correction of all the inner codes in the error correction block 16, the memory control unit 110 reads out outer code data from the memory 111 and similarly transfers them to the error correction processing unit 112. The error correction processing unit 112 performs error correction of outer codes. While reading out the outer code data, the memory control unit 110 reads out the error flag generated in error correction of the inner codes. The error correction processing unit 112 performs erasure correction by using this error flag. The error correction processing unit 112 writes the error-corrected data and the error flag in the memory 111, similar to error correction of the inner codes.

The memory control unit 110 reads out the error-corrected data from the memory 111 and performs descramble processing to reconstruct the data scrambled in generating recording data. The descramble processing is performed by exclusive-ORing the same random data sequence as that in scramble processing and the error-corrected data.

The descrambled data read out from the memory 111 are input to video and sound decoders 113 and 114. The video and sound decoders 113 and 114 respectively extract video and sound data portions from the multiplexed data, and output original video and sound signals.

(Extended Format)

Next, a procedure of generating recording data of the extended format corresponding to a high density and a high reproduction rate which are about twice the recording density and reproduction rate of the standard format will be described in comparison with the procedure of generating recording data of the standard format.

In the procedure of generating recording data of the extended format according to the present invention, an input data sequence is divided into a plurality of channels in units of predetermined data, error correction encoding is performed for each channel by using the same error correction code as that of the standard format to generate an error correction block, the error correction blocks of the respective channels are synthesized, and recording data of the extended format corresponding to a recording density higher than that of the standard format are generated from the synthesized error correction block. More specifically, the input data sequence is divided into n channels (n is an integer of 2 or more) in units of predetermined data. Error correction encoding is performed for each channel by using the same error correction code as that of the standard format to generate the error correction block. The error correction blocks of the respective channels are synthesized. The synthesized error correction block is divided in units of n×m bytes to generate the second data blocks. A sync-pattern is added to each second data block to generate the second sync-block serving as the unit of recording data of the extended format.

More specifically, sector IDs for identifying sectors are added to data sectors prepared by dividing the input data sequence in units of first data, thereby generating logical sectors. The logical sectors are divided into n channels (n is an integer of 2 or more) in units of sectors. Error correction encoding is performed for each channel using the same error correction code as that of the standard format in units of second data including k (k is an integer of 2 or more) logical sectors, thereby generating an error correction block. The error correction blocks of the respective channels are synthesized. The synthesized error correction block is divided in units of n×m bytes to generate the second data blocks. A sync-pattern is added to each second data block to generate the second sync-block serving as the unit of recording data of the extended format.

FIG. 11 is a flow chart showing the procedure of generating recording data of the extended format according to the present invention. Note that processes surrounded by double frames in FIG. 11 are unique to generation of recording data of the extended format.

First, similar to the procedure of generating recording data of the standard format, encode processing such as data compression or multiplexing of additional information is performed for video and sound signals to be recorded (steps S201 and S202). Since the extended format enables high-density, high-speed reproduction, the data rate upon encode processing can be higher than that of the standard format.

Therefore, a high-definition video signal or the like is suitable for an input video signal. In addition, video signals of a plurality of channels can be input and multiplexed.

Next, the encoded video and sound data are multiplexed to generate one input data sequence (bit stream: step S203). The data rate of this input data sequence is about twice the rate of the standard format in accordance with the ratio between the reproduction rates of the standard and extended formats. This input data sequence is divided into 2,048-byte data sectors in the same procedure as that of the standard format (step S204).

To process data of the extended format having a data rate about twice the rate of the standard format, the data processing circuit of the data reproducing apparatus must have about double the processing speed. In this embodiment, assume that the data processing circuit performs parallel processing for n (=2) channels. To facilitate parallel processing of two channels, the input data sequence is divided into a channel A consisting of even sectors and a channel B consisting of odd sectors in units of logical sectors (to be described later).

The bits of the sector IDs (to be described later) are shifted in the respective channels A and B (step S205). A logical sector 11 of 173×12 bytes, like the one shown in FIG. 4, is generated from the data sector by the same logical sector generation procedure as that of the standard format (step S206). Note that bit assignment of the sector ID is partially extended in the extended format (to be described later).

FIG. 12 shows a method of generating a sector ID upon shifting the bits of the sector ID in the extended format in step S205.

First, similar to the standard format, a 24-bit sector number generated in the ascending order in accordance with the time series of the input data sequence, i.e., in the ascending order of the logical sector sequence obtained by arranging logical sectors 11 in time series is divided into an upper 23-bit extended sector number and a 1-bit channel identification bit as the LSB (Least Significant Bit). The sector number obtained in this manner is divided for the channels A and B. Then, the channel A has data sectors to which sector IDs of even sector numbers are assigned, while the channel B has data sectors to which sector IDs of odd sector numbers are assigned.

As shown in the lower portion of FIG. 12, the least significant bit (LSB) of each sector number is arranged as a channel identification bit at the most significant bit (MSB) of the sector ID. As the extended sector number, 23 bits obtained by removing the LSB from the sector number are arranged on the lower bit side of the sector ID. As a result, the sector IDs upon channel division are alternately arranged in the channels A and B in the ascending order.

The procedure of generating the sector IDs in the extended format will be explained in more detail with reference to FIGS. 13A to 13C. Note that a sector number 31 actually consists of 24 bits. For the sake of illustrative simplicity, the sector number 31 consists of 5 bits. First, as shown in FIG. 13A, sector numbers "1" to "32" are arranged in the ascending order in accordance with the time series of the input data sequence to generate the sector number 31. As shown on the left sides of FIGS. 13B and 13C, the sector number sequence in FIG. 13A is divided into a sequence of even numbers "0", "2", "4", . . . for the channel A and a sequence of odd numbers "1", "3", "5", . . . for the channel B. The LSBs of the sector number sequence of each of the channels A and B are arranged at the MSBs of the sector IDs. Then, as shown on the right sides of FIGS. 13B and 13C, the sector IDs are arranged in the ascending order to be "0", "1", "2", . . . , "15" in the channel A and "16", "17", "18", . . . , "31" in the channel B.

With this setting, a channel identification bit "0" indicates the channel A, while a channel identification bit "1" indicates the channel B. In addition, in the respective channels A and B, the sector IDs 32 are arranged in the ascending order, as in the above-described standard format. Therefore, the sector IDs 32 can be generated by the same procedure as that of the standard format.

Note that addition of an IEC, RSV, and EDC and scramble processing are the same as those in the standard format.

In this manner, the procedure of generating logical sectors in the extended format can be realized only by adding a procedure of shifting the bits of the sector IDs to the procedure of generating logical sectors in the standard format. By introducing a simple switching means, a common logical sector generation procedure compatible with the two formats can be easily prepared.

Referring back to FIG. 11, after the sector IDs are shifted in step S205, and the logical sectors are generated in step S206, the logical sectors are divided into the channels A and B in units of sectors (step S207). Error correction encoding is performed for the logical sectors of the respective channels A and B, thereby generating an error correction block (step S208). The error correction block generation method in the extended format will be described.

First, similar to generation of the error correction block 13 in the standard format, 16 logical sectors 11 are stacked in the vertical direction for each divided channel A or B, as shown in FIG. 5. The set of the 16 logical sectors 11 is used as the unit of data of error correction encoding to perform error correction encoding and add check parities (outer and inner code parities), thereby generating two error correction sub-blocks 23A and 23B. As shown in FIG. 14, the error correction sub-blocks 23A and 23B for the respective channels A and B are arranged in the horizontal direction to generate an error correction block 23 of the extended format.

As shown in FIG. 14, the error correction block 23 of the extended format is constituted by 32 successive logical sectors 11, the number of which is twice that of the error correction block 13 of the standard format. Then, outer code parities 14A and 14B and inner code parities 15A and 15B serving as check parities for error correction are generated for the respective error correction sub-blocks 23A and 23B. At this time, as error correction codes, i.e., inner and outer codes used to generate the check parities, the same error codes (double Reed-Solomon product codes) as those of the standard format are used.

In this manner, the error correction block 13 of the standard format shown in FIG. 5 has exactly the same structure as that of the error correction sub-blocks 23A or 23B which constitutes the error correction block 23 of the extended format shown in FIG. 14. Therefore, by preparing parallel the generation procedure of the error correction block 13 of the standard format by the number (n) of channels, the procedure of generating the error correction block 23 of the extended format can be easily prepared.

Then, data rearrangement is performed for the error correction block 23 of the extended format generated in this manner to eliminate a recording data disparity (step S209). As shown in FIG. 14, one row of the error correction block 23 of the extended format is twice as long as that of the error correction block 13 of the standard format shown in FIG. 5, but the number of rows is the same. Therefore, data can be rearranged in units of rows in the same manner as that of the standard format.

The error correction block upon data rearrangement in units of rows is divided into 16 portions in units of 13 rows. That is, the error correction block 23 is divided into recording sectors 27 of the extended format, each of which consists of 182×13×2 bytes (step S210). Each recording sector 27 of the extended format is constituted by two recording sub-sectors 27A and 27B having n parallel channels in the horizontal direction, each of which has the same structure as that of the recording sector 17 of the standard format shown in FIG. 7. That is, the recording sectors 27A and 27B correspond to the channels A and B, respectively.

Next, a procedure of generating a sync-block serving as the minimum unit of recording data from the recording sector 27 of the extended format will be described with reference to FIGS. 16A to 16C.

Figure 16:
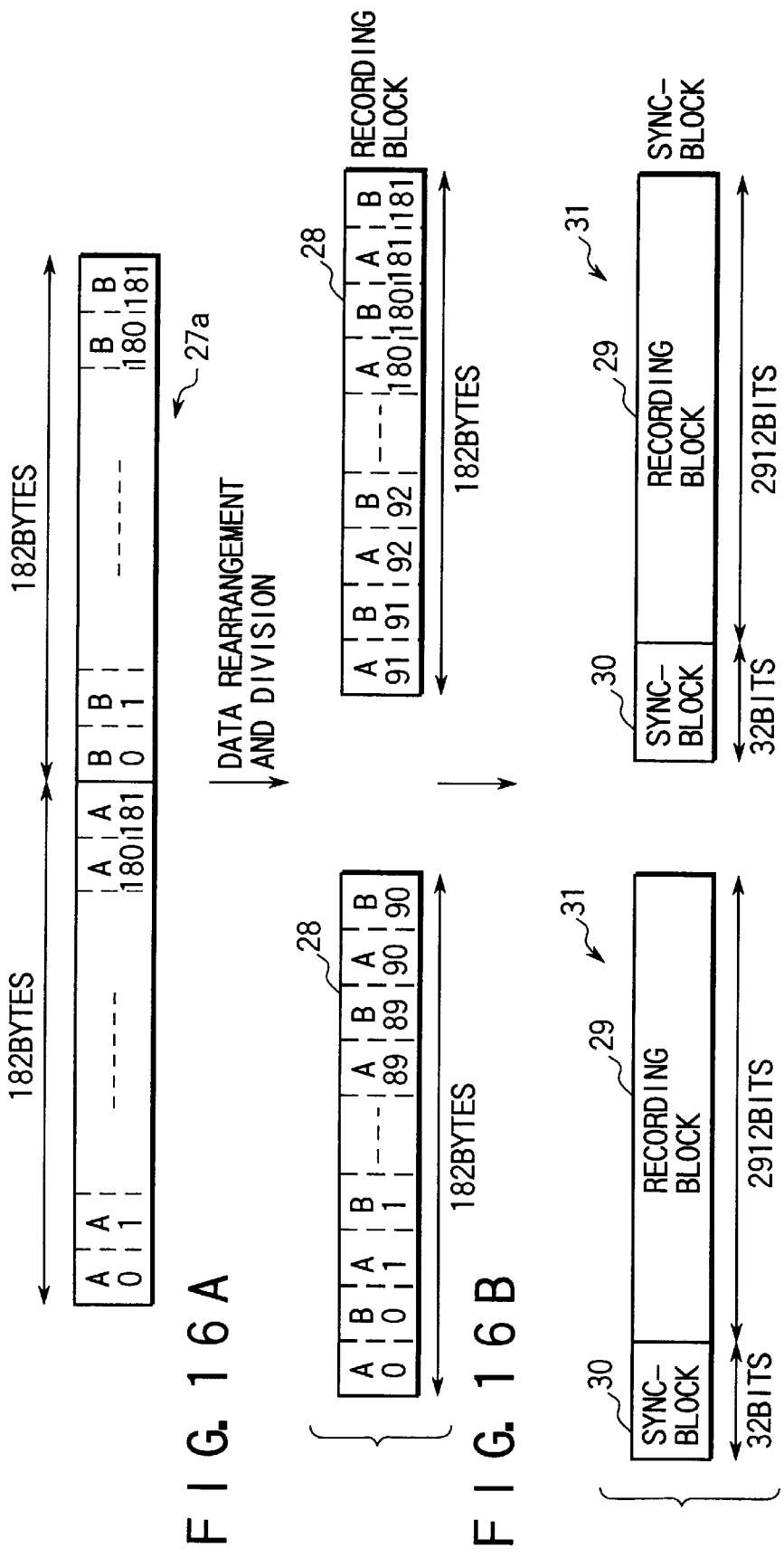
FIGS. 16A to 16C are views showing a procedure of generating a sync-block of the extended format.

First, as shown in FIG. 16A, data 27a of one row are extracted from the recording sector 27 of the extended format. That is, data of one row of the recording sub-sectors 27A and 27B corresponding to the channels A and B are synthesized (channel synthesis) and extracted as the data 27a. As shown in FIG. 16B, the data 27a obtained by channel synthesis are byte-interleaved between 182-byte data of the respective channels in one row in units of bytes. The byte-interleaved data are divided in units of n×m=182 bytes, thereby generating recording blocks 28 as the second data blocks.

The above processing is shown in steps S211 and S212 of FIG. 11. The one-row data 27a of the recording sector 27 of the extended format is constituted by two inner codes. In step S211, data are extracted from these two inner codes A0, A1, ..., A180, and A181, and B0, B1, ..., B180, and B181 in units of bytes, as shown in FIG. 16B. Data are byte-interleaved to alternately arrange the data of the respective inner codes so as to be A0, B0, A1, B1, ..., A90, and B90, and A91, B91, A92, B92, ..., A181, and B181. In step S212, the byteinterleaved data are divided into first and second halves each of 182 bytes, thereby generating the two recording blocks 28 of the extended format. As a result, each recording block 28 of the extended format has a sequence in which data belonging to the respective error correction sub-blocks 23A and 23B are aligned in units of bytes. The recording block 28 is twice as long as the recording block 18 of the standard format.

Figure 15:
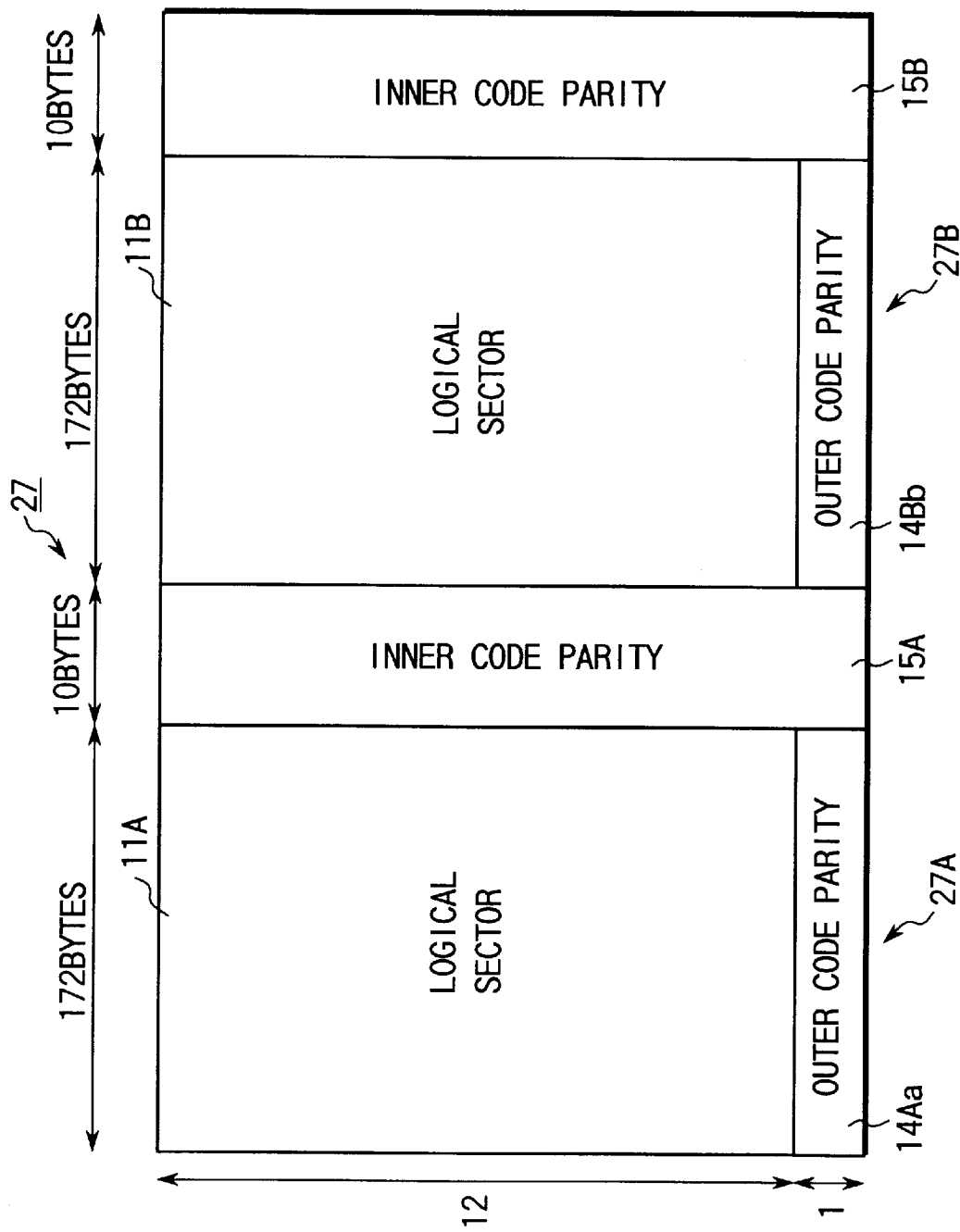
FIG. 15 is a view showing the structure of a recording sector of the extended format.

In this manner, data are byte-interleaved between data of n×m bytes of the respective channels A and B in the one-row data 27a of the error correction block 27 upon channel synthesis. The sector IDs (A0 to A3 and B0 to B3) are gathered in the left recording block 28 in FIG. 16B which corresponds to the first one-row data 27a of the recording sector 27 in FIG. 15, similar to the left recording block 18 of the standard format shown in FIG. 8B. That is, the sector IDs are recorded on sync-blocks 31 corresponding to the heads of the recording sub-sectors 27A and 27B, similar to the standard format.

Data rearrangement in units of rows in step S209 can be processed by the same algorithm. Therefore, by adding a procedure of byte-interleaving data within one row in the case of the extended format, a common recording block generation procedure compatible with the two formats can be easily prepared.

The data of the recording block 28 of the extended format obtained in step S212 are converted, i.e., modulated in accordance with the medium of a recording/reproducing system and signal transmission characteristics (step S213). The modulation method for the recording block 28 of the extended format is the same as that for the recording block of the standard format. For example, if the 8/16-modulation processing described above is used, 182-byte data which constitute the recording block 28 are modulated into 2,912-bit data.

As shown in FIG. 16C, a 32-bit sync-pattern 30 is added to the head of the modulated recording block 28 of the extended format to generate a 2,944-bit sync-block 31 (step S214). This sync-block 31 is the unit of recording data of the extended format. The sync-block 31 is output to a recording circuit (not shown) to record data on a recording medium (optical disk: step S215).

As described above, the sync-block 21 of the standard format is assigned with a pattern selected from the eight types of sync-pattern sequences SY0 to SY7 for the sync-pattern 20 in accordance with the position of the recording block 19 in the modulated recording sector 17'. As described above, the number of sync-blocks 31 corresponding to the modulated recording sectors 27' of the extended format is the same as the number of sync-blocks 21 corresponding to the modulated recording sectors 17' of the standard format (in this case, the number of sync-blocks is 26). For this reason, the same sync-pattern assignment method can be used for the two formats.

FIG. 17 shows the correspondence between the sync-pattern sequences SY0 to SY7 and the recording block 29 of the extended format in this case. As shown in FIG. 17, the method of assigning the sync-pattern from the sync-pattern sequences SY0 to SY7 is the same except that the size of the recording block 29 having the sync-pattern 30 is twice as large as that of the standard format. Therefore, the same method can be used as an algorithm for detection of the sync-pattern, determination of the boundary of the recording sector, and the like in the standard and extended formats.

In both the standard and extended formats, the sector IDs are always recorded on the sync-patterns 20 and 30 corresponding to the heads of the modulated recording sectors 17' and 27'. Therefore, the process of extracting the sector number compatible with the two formats can be easily employed.

According to this embodiment, the extended format uses the error correction block 23 constituted by the error correction sub-blocks 23A and 23B corresponding to the number n (=2) of channels, each of which has the same structure as that of the error correction block 13 of the standard format. That is, the ratio of the number of check parities to main data is constant in both the standard and extended formats. Compared to recording data of the conventional extended format using an increased number of check parities with respect to the same main data, the data recording efficiency of the extended format is not lower than that of the standard format. According to the extended format of this embodiment, the error correction ability for burst errors can be enhanced without decreasing the data recording efficiency.

The procedure of generating recording data of the extended format according to this embodiment is realized by adding only the following steps to the procedure of generating recording data of the standard format. That is, (1) an input data sequence is divided into n channels in units of logical sectors. (2) The bits of sector IDs are shifted. (3) Data are byte-interleaved within one row of a recording sector so as to gather the sector IDs in the recording block of one channel. (4) The sync-block length (recording block length) is changed. With this procedure, the main part of processing including generation of the check parity of an error correction code can be performed in common for the two formats. Therefore, a common recording data generation procedure compatible with the two formats can be easily prepared.

Next, the reason why this extended format has a higher error correction ability particularly for burst errors than those of the standard and conventional extended formats described above will be explained in detail.

It is considered that the occurrence frequency of data errors is higher in the extended format because a recording medium recorded in the extended format has a recording density higher than that of a recording medium recorded in the standard format. Errors which occur are classified into random errors which occur due to the influence of noise of reproduction signals, and burst errors which successively occur due to defects of the recording medium. As a factor of increasing the occurrence frequency of random errors, a decrease in signal-to-noise ratio (S/N) upon a decrease in reproduction signal output can be considered. As a factor of increasing the occurrence frequency of burst errors, it can be considered that, even if the size of a defect on a recording medium is constant, the number of bits serving as errors increases because of a high density.

To maintain the data reliability, the error correction ability of the extended format must be set higher than that of the standard format. Since random errors can be corrected by improving a reproducing device such as an optical pickup, it is important in the extended format to particularly improve the correction ability for burst errors.

The error correction abilities of the two formats for burst errors will be compared. In the standard format, an error flag is generated when burst errors exceed the error correction ability of an inner code, and an outer code can utilize this error flag as erasure information to correct an erasure error of 16 bytes or less. Therefore, by combining the inner and outer codes, burst errors in 32 or less sync-blocks 21 can be corrected. Since each sync-block 21 of the standard format consists of 1,488 bits, burst errors of 47,616 bits or less can be corrected. Since errors of 5 bytes or less can be corrected only by the inner code, burst errors of 80 bits or less can be corrected only 64 the inner code.

On the other hand, in the extended format, erasure errors of 16 bytes or less can be similarly corrected by the outer code. Since data in one row are byte-interleaved between the two error correction sub-blocks 23A and 23B, burst errors are distributed to the two error correction sub-blocks 23A and 23B. By combining the inner and outer codes, burst errors in 32 or less sync-blocks 31 can be corrected. Since each sync-block 31 of the extended format consists of 2,944 bits, burst errors of 94,208 bits or less can be corrected. Since errors of 5 bytes or less can be corrected only by the inner code, burst errors of 160 bits or less can be corrected only by the inner code upon byte-interleaving data in one row.

According to the extended format of this embodiment, the maximum length of correctable burst errors is substantially doubled, and the error correction ability for burst errors is improved. In this extended format, burst errors of 80 to 160 bits can be additionally corrected only by the inner code, compared to the standard format. That is, the correction ability for relatively short burst errors is low in the conventional method of increasing the number of check parities to enhance the error correction ability. However, in the extended format of this embodiment, relatively short burst errors can also be corrected, as described above.

Next, a data reproducing apparatus capable of reproducing data from an optical disk on which data is recorded in the standard format and an optical disk on which data is recorded in the extended format will be described with reference to FIG. 18 in which the same reference numerals denote the same parts as in FIG. 10.

Referring to FIG. 18, recording data of the standard or extended format generated by the above-described procedure are recorded on an optical disk 101 in advance. A spindle motor 102, an optical pickup 103, an analog operation circuit 104, a quantization circuit 105, a sync detection circuit 106, a servo circuit 107, and a demodulation circuit 108 basically have the same arrangements as those of the data reproducing apparatus dedicated for the standard format shown in FIG. 10. To cope with an increase in data rate along with an increase in speed of the extended format, a circuit system using a high and broad frequency band is realized.

A format identification unit 120 identifies during reproduction whether data is recorded on the optical disk 101 in the standard or extended format, i.e., the reproduced data are in the standard or extended format. Possible identification methods are a method of automatically identifying the data format on the basis of the data rate of reproduced data or a detection interval between specific patterns such as sync-patterns when the optical disk 101 is rotated at a predetermined speed, a method using an external instruction, and the like.

The identification result of the format identification unit 120 is used to switch signal processing suitable for reproduced data of the standard format or reproduced data of the extended format in the sync detection circuit 106, the servo circuit 107, a channel division unit 121, and a channel synthesis unit 122.

The sync detection circuit 106 detects a sync-pattern added to the head of a sync-block from a quantized signal, and at the same time determines the boundaries of a demodulation symbol, a recording block, and a recording sector. In this case, the lengths of the sync-blocks of the standard and extended formats are different, i.e., the former is 1,488 bits, and the latter is 2,944 bits. To accurately detect the sync-pattern 20 or 30, the length of a sync-block to be detected must be switched in accordance with the recording format of the optical disk 101 during reproduction. The length of the sync-block can be easily switched by switching a counter value for counting the detection interval of the sync-pattern 20 or 30. On the other hand, the structures of the sync-pattern sequences SY0 to SY7 in the modulated recording sectors 17' and 27' are the same in the two formats. For this reason, the boundary of the recording sector 17 or 27 can be determined by exactly the same algorithm in the two formats.

Reproduced data from the demodulation circuit 108 are input to the channel division unit 121. The channel division unit 121 is controlled by the identification result of the format identification unit 120 and a sync-pattern detection signal from the sync detection circuit 106. When data recorded on the optical disk 101 are in the extended format, the channel division unit 121 divides the reproduced data into the two channels A and B. This channel division is performed by a procedure reverse to the procedure of byte-interleaving data within one row in formatting recording data. Data are distributed to the two channels A and B in units of bytes on the basis of the boundary between the sync-blocks. Division in units of bytes requires no dedicated memory, and can be realized by a small-size circuit such as an 8-bit serial-to-parallel converter.

When data recorded on the optical disk 101 are in the standard format, the reproduced data are not divided into two channels A and B by the channel division unit 121, and all the data are output to one channel. In this case, it is possible to inhibit output of data to the other channel or to output the same data as that of one channel.

The reproduced data sequence of the extended format upon channel division has exactly the same form of the reproduced data sequence of the standard format. In addition, the two error correction sub-blocks 23A and 23B included in the error correction block of the extended format are divided into the two channels A and B. Each of the error correction sub-blocks 23A and 23B has the same structure as that of the error correction block 13 of the standard format. Subsequent signal processing such as memory control and error correction processing can be performed regardless of the format of the reproduced data.

The reproduced data upon channel division are respectively input to memory control units 110A and 110B in data processing units 109A and 109B of the channels A and B which are constituted similar to the data processing unit 109 in the reproducing apparatus for the standard format shown in FIG. 10. When the reproduced data of the standard format are to be processed, the reproduced data are output to only one channel by the channel division unit 121. The data processing units 109A and 109B process only one channel to which the reproduced data are input, and do not process the other channel or do not use the processing result.

The reason why the reproduced data can be processed without discriminating the reproduced data of the two formats will be described below by giving attention to the difference between the two formats. As a result of channel division, the recording position of the sector ID in the error correction block 13 of the standard format is the same as the recording position of the sector ID in the error correction sub-block 23A or 23B of the extended format. Therefore, the sector ID can be similarly extracted in the two formats.

To the contrary, the method of generating the sector ID is different in the two formats. However, when attention is given to changes in sector IDs added to the recording sectors 17 and 27 input to each channel, the sector IDs are arranged in the ascending order of the recording sectors to which the sector IDs are input (see FIGS. 13A to 13C). Therefore, the ID check method of the standard format using the regularity of the sector IDs can also be used when data of the extended format are processed. When attention is given to recording sector IDs input parallel to the channels A and B subjected to parallel processing, only the MSBs of the sector IDs are different. As for setting data related to the sector IDs, data for channels subjected to parallel processing can be easily, simultaneously generated.

The reproduced data are written in a memory 111A or 111B on the basis of the sector ID extracted in this manner and the head of the sector. Error correction and descramble processing are performed for the data written in the memory 111A or 111B. These processes can also be performed by the same procedure in the two formats because the structure of the error correction code in the error correction block of the standard format is the same as that in the error correction sub-block of the extended format.

When the reproduced data of the extended format are to be processed, the reproduced data are read out from the memories 111A and 111B in units of logical sectors upon completion of descramble processing, and synthesized into one data sequence in the channel synthesis unit 122. The channel synthesis unit 122 synthesizes the data in units of logical sectors so as to make the sector numbers of the sector IDs of the output logical sectors successive in the ascending order.

If the read rate of data from the memories 111A and 111B can be made equal to the output speed upon channel synthesis, the channel synthesis unit 122 requires no memory dedicated for multiplex. That is, a target data sequence can be formed by alternately reading data from the respective channels in units of sectors in accordance with the sector numbers of output sectors.

If the data read rates of the memories 111A and 111B are low and do not satisfy the output speed upon channel synthesis, data are multiplexed in units of sectors by using the memories as follows. First, data are read out parallel from the memories 111A and 111B of the respective channels in units of logical sectors. At this time, the memory control units 110A and 110B are controlled such that only the MSBs of the sector IDs of two logical sectors read out parallel are different and remaining bits coincide with each other. The data read out from the memories 111A and 111B are written parallel in a multiplex memory again, and the data are read out from the multiplex memory at a predetermined output speed so as to make the sector numbers of the sectors successive in the ascending order. In the standard format, data read out from the memory of one channel, to which the reproduced data are input, are directly output.

The data of one sequence are input to video and sound decoders 113 and 114. The video and sound decoders 113 and 114 respectively extract video and sound data portions from the multiplexed data, and output original video and sound signals.

The servo circuit 107 generates a servo control signal for controlling an object lens, the spindle motor 102, and the like on the basis of an error signal from the analog operation circuit 104 and a sync-pattern detection signal from the sync detection circuit 106, thereby controlling the focus and tracking servos and the rotation speed of the spindle motor 102. When target values of the rotation speed of the optical disk 101 are different in the two formats, the servo circuit 107 switches control parameters on the basis of the identification result of the format identification unit 120, and controls the rotation speed suitable for each format.

Figure 19:
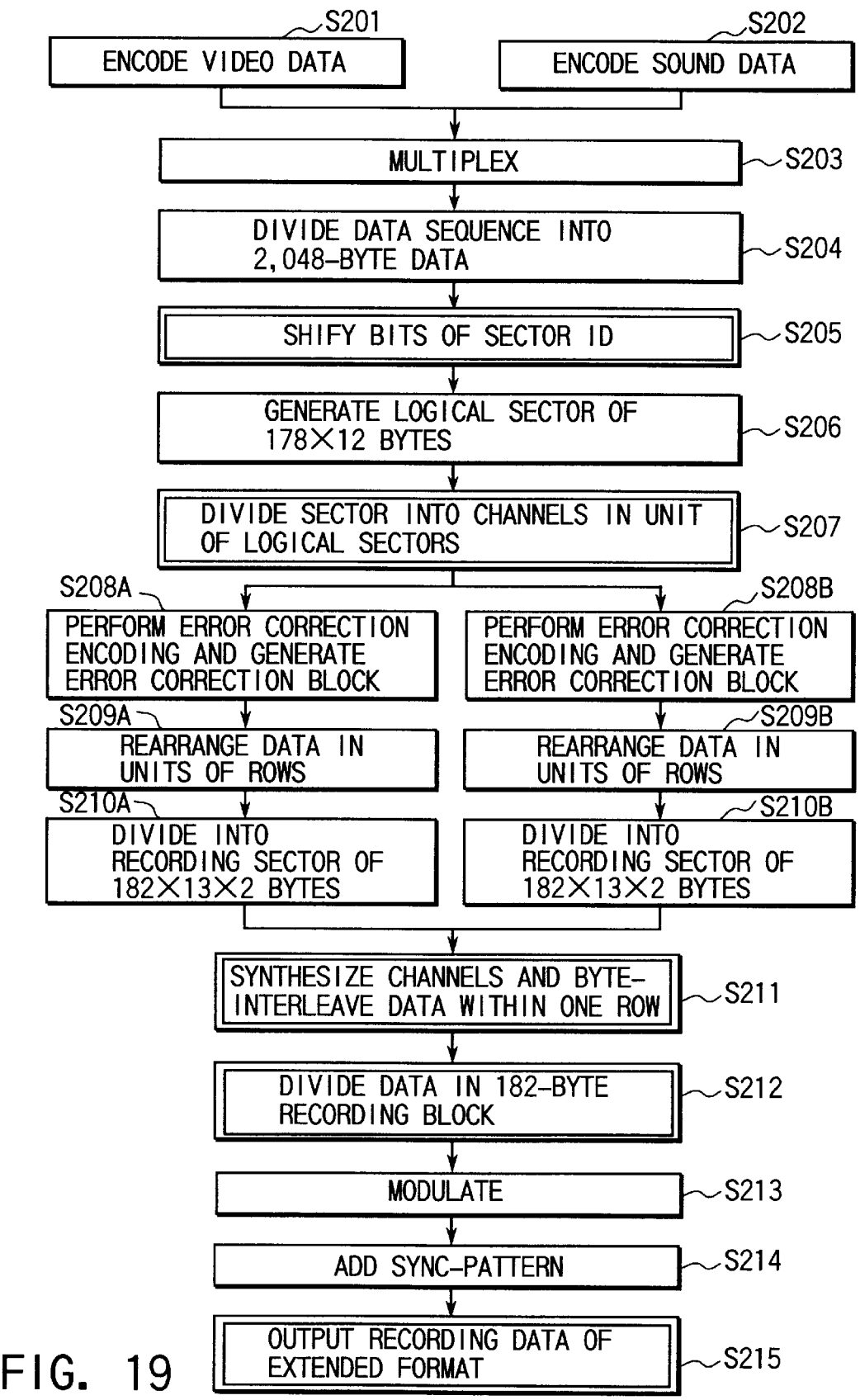
FIG. 19 is a flow chart showing a procedure of generating recording data of the extended format corresponding to FIG. 18 in this embodiment.

FIG. 19 is a flow chart showing a procedure of generating recording data of the extended format corresponding to the data reproducing apparatus shown in FIG. 18. This procedure is different from the procedure shown in FIG. 11 in that this procedure comprises steps S208A and S208B of performing error correction encoding and generation of error correction codes upon division into respective channels, steps S209A and S209B of rearranging data in units of rows, and steps S210A and S210B of dividing recording sectors in units of 182 13 bytes.

In this manner, the data reproducing apparatus of this embodiment can process reproduced data of the extended format in addition to reproduced data of the standard format by adding only the following arrangement to the signal processing circuit for the standard format. That is, (1) the identification result of the format identification unit 120 is supplied to the sync detection circuit 106, the channel division unit 121, the channel synthesis unit 122, and the servo circuit 107. (2) The interval (sync-block length) between sync-patterns to be detected by the sync detection circuit 106 is switched. (3) The number n of channels in dividing reproduced data by the channel division unit 121 is switched. (4) The number n of channels in synthesizing sectors in the channel synthesis unit 122 is switched. (5) The control parameters for the rotation speed of the optical disk 101 and the like in the servo circuit 107 are switched. (6) The data processing units 109A and 109B for performing error correction processing and the like are additionally arranged in correspondence with the number n of channels subjected to parallel processing.

In this data reproducing apparatus, compared to the conventional apparatus, the data processing units 109A and 109B, including error correction processing units 112A and 112B which constitute the main part of the signal processing circuit, need not operate at a high speed, and no special signal processing circuits dedicated for the standard and extended formats are required. Since the data reproducing apparatus is realized by arranging parallel identical data processing circuits for the standard and extended formats, the density and speed can be further increased easily.

As has been described in detail above, according to the present invention, an input data sequence is divided into a plurality of channels, error correction encoding is performed for the respective channels using the same error correction code as that used in generating recording data of the standard format, and error correction blocks of the respective channels are synthesized to generate recording data of the extended format. With this processing, the error correction ability for burst errors can be improved without using a larger number of check parities than that of the standard format, i.e., without decreasing the data recording efficiency.

Since the same error correction code is used in generating recording data of the standard and extended formats, a common algorithm can be used for error correction encoding. By preparing parallel the procedure of generating an error correction block of the standard format by the number (n) of channels, the procedure of generating an error correction block of the extended format can be easily prepared.

In dividing a synthesized correction block in units of n×m bytes, data are byte-interleaved between data of the respective channels so as to gather sector IDs in one sync-block. With this processing, since the sector IDs are recorded on the sync-block at the head of a recording sector in both the standard and extended formats, the process of extracting the sector IDs in data reproduction is facilitated.

When the second data blocks are to be generated in generating recording data of the extended format, sector IDs are added to logical sectors so as to arrange the sector IDs in the ascending order of the generation order of the second data blocks in each channel. With this processing, generation of the sector IDs can be performed by the same procedure as that of the standard format.

Further, assume that a sync-pattern to be added to the first data block and a sync-pattern to be added to the second data block are selected from a common sync-pattern sequence, and assigned. In data reproduction, the same method can be used as an algorithm for detection of the sync-pattern and determination of the boundary position of the recording sector in the standard and extended formats.

In the data reproducing apparatus according to the present invention, the format of reproduced data read from a recording medium is identified, and channel division of the reproduced data and channel synthesis of data upon data processing including error correction processing are performed on the basis of the identification result. With this processing, reproduced data of both the standard and extended formats can be easily processed. In addition, by preparing data processing circuits compatible with the standard format by the number of channels, the reproduced data of both the standard and extended formats can be processed, and no high-speed, complicated data processing circuit dedicated for the extended format is required.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, the above embodiment exemplifies the case wherein the format identification function is set in the data reproducing apparatus. Alternatively, this function can be arranged as a device dedicated for format identification outside this apparatus.

What is claimed is:

1. A method of generating recording data of an extended format corresponding to a recording density higher than that of a standard format, in which, in generation of recording data of the standard format, an error correction block obtained by performing error correction encoding for an input data sequence by using a predetermined error correction code is divided in units of m bytes (m is an integer of not less than 1) to generate first data blocks, and sync-patterns are added to the first data blocks to generate first sync-blocks each serving as a unit of the recording data, comprising the steps of:

dividing an input data sequence into n channels (n is an integer of not less than 2) in units of predetermined data;

performing error correction encoding for the respective channels by using the same error correction code as that of the standard format, thereby generating error correction blocks;

synthesizing the error correction blocks of the respective channels;

dividing the synthesized error correction block in units of n×m bytes to generate second data blocks; and adding sync-patterns to the second data blocks to generate second sync-blocks each serving as a unit of the recording data of the extended format.

2. A method according to claim 1, wherein a sync-pattern added to a first data block and a sync-pattern added to a second data block are selectively assigned from a common sync-pattern sequence.

3. A method according to claim 1, wherein each second sync-block is longer than each first sync-block.

4. A method according to claim 1, wherein the first and second blocks are data-converted, and the sync-patterns are added to data blocks upon data conversion, thereby generating the first and second sync-blocks.

5. A method of generating recording data of an extended format corresponding to a recording density higher than that of a standard format, in which, in generation of recording data of the standard format, sector IDs for identifying sectors are added to data sectors obtained by dividing an input data sequence in units of first data, thereby generating logical sectors, error correction blocks obtained by performing error correction encoding using a predetermined error correction code in units of second data including k (k is an integer of not less than 2) logical sectors are divided in units of m bytes (m is an integer of not less than 1) to generate first data blocks, and sync-patterns are added to the first data blocks to generate first sync-blocks each serving as a unit of the recording data, comprising the steps of:

adding sector IDs for identifying sectors to data sectors obtained by dividing an input data sequence in units of first data, thereby generating logical sectors;

dividing the logical sectors into n channels (n is an integer of not less than 2) in units of sectors;

performing error correction encoding for the respective channels by using the same error correction code as that of the standard format, thereby generating error correction blocks;

synthesizing the error correction blocks of the respective channels;

dividing the synthesized error correction block in units of n×m bytes to generate second data blocks; and adding sync-patterns to the second data blocks to generate second sync-blocks each serving as a unit of the recording data of the extended format.

6. A method according to claim 5, wherein the step of dividing the synthesized error correction block in units of n×m bytes comprises rearranging data so as to gather the sector IDs of the respective channels in one sync-block.

7. A method according to claim 5, wherein the step of generating the second data blocks comprises adding the sector IDs to the logical sectors so as to arrange the sector IDs in an ascending order with respect to a generation order of the second data blocks for the respective channels.

8. A recording medium on which recording data of an extended format corresponding to a recording density higher than a standard format is recorded by a predetermined generation procedure, in which, in generation of recording data of the standard format, an error correction block obtained by performing error correction encoding for an input data sequence by using a predetermined error correction code is divided in units of m bytes (m is an integer of not less than 1) to generate first data blocks, and sync-patterns are added to the first data blocks to generate first sync-blocks each serving as a unit of the recording data, the generation procedure comprising:

dividing an input data sequence into n channels (n is an integer of not less than 2) in units of predetermined data;

performing error correction encoding for the respective channels by using the same error correction code as that of the standard format, thereby generating error correction blocks;

synthesizing the error correction blocks of the respective channels;

dividing the synthesized error correction block in units of n×m bytes to generate second data blocks; and adding sync-patterns to the second data blocks to generate second sync-blocks each serving as a unit of the recording data of the extended format.

9. A medium according to claim 8, wherein a sync-pattern added to a first data block and a sync-pattern added to a second data block are selectively assigned from a common sync-pattern sequence.

10. A medium according to claim 8, wherein each second sync-block is longer than each first sync-block.

11. A medium according to claim 8, wherein the first and second blocks are data-converted, and the sync-patterns are added to data blocks upon data conversion, thereby generating the first and second sync-blocks.

12. A recording medium on which recording data of an extended format corresponding to a recording density higher than a standard format is recorded by a predetermined generation procedure, in which, in generation of recording data of the standard format, sector IDs for identifying sectors are added to data sectors obtained by dividing an input data sequence in units of first data, thereby generating logical sectors, error correction blocks obtained by performing error correction encoding using a predetermined error correction code in units of second data including k (k is an integer of not less than 2) logical sectors are divided in units of m bytes (m is an integer of not less than 1) to generate first data blocks, and sync-patterns are added to the first data blocks to generate first sync-blocks each serving as a unit of the recording data, the generation procedure comprising the steps of:

adding sector IDs for identifying sectors to data sectors obtained by dividing an input data sequence in units of first data, thereby generating logical sectors;

dividing the logical sectors into n channels (n is an integer of not less than 2) in units of sectors;

performing error correction encoding for the respective channels by using the same error correction code as that of the standard format, thereby generating error correction blocks;

synthesizing the error correction blocks of the respective channels;

dividing the synthesized error correction block in units of n×m bytes to generate second data blocks; and adding sync-patterns to the second data blocks to generate second sync-blocks each serving as a unit of the recording data of the extended format.

13. A medium according to claim 12, wherein the step of dividing the synthesized error correction block in units of n×m bytes comprises rearranging data so as to gather the sector IDs of the respective channels in one sync-block.

14. A medium according to claim 12, wherein the step of generating the second data blocks comprises adding the sector IDs to the logical sectors so as to arrange the sector IDs in an ascending order with respect to a generation order of the second data blocks for the respective channels.

15. A data reproducing apparatus for reading and processing data of a standard or extended format which are recorded on a recording medium and use, as a unit, a sync-pattern and a subsequent sync-block consisting of a data block having undergone error correction encoding using the same error correction code, comprising:

format identification means to identify whether a format of the reproduced data read from said recording medium is the standard format or the extended format corresponding to a recording density higher than that of the standard format;

sync detection means to detect the sync-pattern from the reproduced data;

channel division means to, on the basis of an identification result of said format identification means and a sync-pattern detection position by said sync detection means, output the reproduced data to at least one channel when the reproduced data are in the standard format, and divide and output the reproduced data into a plurality of channels when the reproduced data are in the extended format;

error correction means to perform error correction processing for the reproduced data output from said channel division means; and correction outputting means to, on the basis of the identification result of said format identification means, output the reproduced data of at least one channel having undergone error correction processing when the reproduced data are in the standard format, and synthesize and output the reproduced data of the plurality of channels having undergone error correction processing when the reproduced data are in the extended format, wherein data of the standard format are data using a first sync-block as a unit, the first sync-block being generated such that an error correction block obtained by performing error correction encoding for an input data sequence by using a predetermined error correction code is divided in units of m bytes (m is an integer of not less than 1), thereby generating first data blocks, and a sync-pattern is added to each first data block, and data of the extended format are data using a second sync-block as a unit, the second sync-block being generated such that an input data sequence is divided into n channels (n is an integer of not less than 2) in units of predetermined data, error correction encoding is performed for the respective channels by using the same error correction code as that of the standard format, thereby generating error correction blocks, the error correction blocks are synthesized, the synthesized error correction block is divided in units of n×m bytes to generate second data blocks, and a sync-pattern is added to the second data block.

16. A data reproducing apparatus for reading and processing data of a standard or extended format which are recorded on a recording medium and use, as a unit, a sync-pattern and a subsequent sync-block consisting of a data block having undergone error correction encoding using the same error correction code, comprising:

format identification means to identify whether a format of the reproduced data read from said recording medium is the standard format or the extended format corresponding to a recording density higher than that of the standard format;

sync detection means to detect the sync-pattern from the reproduced data;

channel division means to, on the basis of an identification result of said format identification means and a sync-pattern detection position by said sync detection means, output the reproduced data to at least one channel when the reproduced data are in the standard format, and divide and output the reproduced data into a plurality of channels when the reproduced data are in the extended format;

error correction means to perform error correction processing for the reproduced data output from said channel division means; and correction outputting means to, on the basis of the identification result of said format identification means, output the reproduced data of at least one channel having undergone error correction processing when the reproduced data are in the standard format, and synthesize and output the reproduced data of the plurality of channels having undergone error correction processing when the reproduced data are in the extended format, wherein data of the standard format data are data using a first sync-block as a unit, the first sync-block being generated such that a sector ID for identifying a sector is added to a data sector obtained by dividing an input data sequence in units of first data, thereby generating a logical sector, an error correction block obtained by performing error correction encoding using a predetermined error correction code in unit of second data including k (k is an integer of not less than 2) logical sectors is divided in units of m bytes (m is an integer of not less than 1) to generate first data blocks, and a sync-pattern is added to each first data block, and data of the extended format are data using a second sync-block as a unit, the second sync-block being generated such that a sector ID for identifying a sector is added to a data sector obtained by dividing an input data sequence in units of first data, thereby generating a logical sector, the logical sector is divided into n channels (n is an integer of not less than 2) in units of sectors, error correction encoding is performed for the respective channels in units of second data by using the same error correction code as that of the standard format, thereby generating error correction blocks, the error correction blocks of the respective channels are synthesized, the synthesized error correction block is divided in units of n×m bytes to generate second data blocks, and a sync-pattern is added to each second data block.

17. A data reproducing apparatus for reading and processing data of a standard or extended format which are recorded on a recording medium and use, as a unit, a sync-pattern and a subsequent sync-block consisting of a data block having undergone error correction encoding using the same error correction code, comprising;

sync detection means to detect the sync-pattern from the reproduced data read from said recording medium;

channel division means to, on the basis of a sync-pattern detection position by said sync detection means, output the reproduced data to at least one channel when the reproduced data are in the standard format, and divide and output the reproduced data into a plurality of channels when the reproduced data are in the extended format;

error correction means to perform error correction processing for the reproduced data output from said channel division means; and correction output means to output the reproduced data of at least one channel having undergone error correction processing when the reproduced data are in the standard format, and synthesize and output the reproduced data of the plurality of channels having undergone error correction processing when the reproduced data are in the extended format, wherein data of the standard format are data using a first sync-block as a unit, the first sync-block being generated such that an error correction block obtained by performing error correction encoding for an input data sequence by using a predetermined error correction code is divided in units of m bytes (m is an integer of not less than 1), thereby generating first data blocks, and a sync-pattern is added to each first data block, and data of the extended format are data using a second sync-block as a unit, the second sync-block being generated such that an input data sequence is divided into n channels (n is an integer of not less than 2) in units of predetermined data, error correction encoding is performed for the respective channels by using the same error correction code as that of the standard format, thereby generating error correction blocks, the error correction blocks are synthesized, the synthesized error correction block is divided in units of n×m bytes to generate second data blocks, and a sync-pattern is added to each second data block.

18. A data reproducing apparatus for reading and processing data of a standard or extended format which are recorded on a recording medium and use, as a unit, a sync-pattern and a subsequent sync-block consisting of a data block having undergone error correction encoding using the same error correction code, comprising;

sync detection means to detect the sync-pattern from the reproduced data read from said recording medium;

channel division means to, on the basis of a sync-pattern detection position by said sync detection means, output the reproduced data to at least one channel when the reproduced data are in the standard format, and divide and output the reproduced data into a plurality of channels when the reproduced data are in the extended format;

error correction means to perform error correction processing for the reproduced data output from said channel division means; and correction output means to output the reproduced data of at least one channel having undergone error correction processing when the reproduced data are in the standard format, and synthesize and output the reproduced data of the plurality of channels having undergone error correction processing when the reproduced data are in the extended format, wherein data of the standard format data are data using a first sync-block as a unit, the first sync-block being generated such that a sector ID for identifying a sector is added to a data sector obtained by dividing an input data sequence in units of first data, thereby generating a logical sector, an error correction block obtained by performing error correction encoding using a predetermined error correction code in unit of second data including k (k is an integer of not less than 2) logical sectors is divided in units of m bytes (m is an integer of not less than 1) to generate first data blocks, and a sync-pattern is added to each first data block, and data of the extended format are data using a second sync-block as a unit, the second sync-block being generated such that a sector ID for identifying a sector is added to a data sector obtained by dividing an input data sequence in units of first data, thereby generating a logical sector, the logical sector is divided into n channels (n is an integer of not less than 2) in units of sectors, error correction encoding is performed for the respective channels in units of second data by using the same error correction code as that of the standard format, thereby generating error correction blocks, the error correction blocks of the respective channels are synthesized, the synthesized error correction block is divided in units of n×m bytes to generate second data blocks, and a sync-pattern is added to each second data block.

* * * * *